(12) United States Patent
McCloskey et al.

(10) Patent No.: US 11,076,695 B1
(45) Date of Patent: Aug. 3, 2021

(54) LEVELING SYSTEM

(71) Applicants: Joshua A. McCloskey, Bellefonte, PA (US); Brian D. Zanzalari, Bellefonte, PA (US); David Johnson, Howard, PA (US)

(72) Inventors: Joshua A. McCloskey, Bellefonte, PA (US); Brian D. Zanzalari, Bellefonte, PA (US); David Johnson, Howard, PA (US)

( * ) Notice: Subject to any disclaimer, the term of this patent is extended or adjusted under 35 U.S.C. 154(b) by 205 days.

(21) Appl. No.: 16/275,599

(22) Filed: Feb. 14, 2019

Related U.S. Application Data

(60) Provisional application No. 62/630,434, filed on Feb. 14, 2018.

(51) Int. Cl.
| | |
|---|---|
| *G01C 9/02* | (2006.01) |
| *A47B 91/16* | (2006.01) |
| *A47B 91/02* | (2006.01) |
| *A63D 15/00* | (2006.01) |

(52) U.S. Cl.
CPC ............ *A47B 91/16* (2013.01); *A47B 91/022* (2013.01); *G01C 9/02* (2013.01); *A63D 15/00* (2013.01)

(58) Field of Classification Search
CPC ........ A47B 91/16; A47B 91/022; G01C 9/02; A63D 15/00
USPC .................................................. 33/340, 370
See application file for complete search history.

(56) References Cited

U.S. PATENT DOCUMENTS

| | | | | |
|---|---|---|---|---|
| 4,027,878 A | * | 6/1977 | Dadbeh ................... | A63D 15/00 473/29 |
| 4,686,773 A | * | 8/1987 | Brewer ..................... | G01C 5/04 33/367 |
| 6,158,134 A | * | 12/2000 | Warner, Jr. .............. | G01C 9/26 33/370 |
| 6,619,662 B2 | * | 9/2003 | Miller ................. | A63F 3/00157 273/148 R |
| 2002/0089120 A1 | * | 7/2002 | Miller ................. | G07F 17/3262 273/274 |
| 2007/0193046 A1 | * | 8/2007 | Arlinsky ................... | G01C 9/06 33/366.11 |
| 2009/0041879 A1 | * | 2/2009 | Baum ..................... | E04G 11/24 425/63 |
| 2009/0270191 A1 | * | 10/2009 | Cartwright ............. | A63D 15/00 473/33 |

* cited by examiner

*Primary Examiner* — Yaritza Guadalupe-McCall
(74) *Attorney, Agent, or Firm* — John J. Elnitski, Jr.

(57) ABSTRACT

A leveling system for leveling a table having a top surface and at least three legs. The leveling system including at least three sensor bars that act as individual digital levels adapted to be placed on top surface of the table. The leveling system including a leg movement system adapted to be attached to the table and adapted to raise and lower the legs to achieve a level top surface. The leveling system including a controller system that is connected to the sensor bars to receive data from the sensors bars and to the leg movement system to command movement of the leg movement system that is adapted to raise and lower the table, the controller system including a leveling software algorithm which inputs the data from the sensor bars and controls activation of the leg movement system.

10 Claims, 29 Drawing Sheets

Overall System Flowchart

LEVELING SYSTEM

This application claims the benefit of and incorporates by reference U.S. Provisional Applications No. 62/630,434, filed Feb. 14, 2018.

BACKGROUND

The present invention generally relates to leveling of a surface. More specifically, the present invention relates to a leveling of a surface with adjustable legs.

Leveling a table within +/−0.01 degrees by adjusting leg height using a hand level can be a difficult task and take up to an hour or more to perform. Most leveling systems associated with gaming tables, especially pool tables include mechanical adjustments to the table surface instead of the legs. These systems are complicated and expensive, as they must be built into the table and thereby cannot be used with another table. It would be simpler to have a portable system that could be used with different tables to adjust table leg height.

It is an object of the present invention to provide leveling system to level tables that is portable and adjusts leg height.

SUMMARY

A leveling system for leveling a table having a top surface and at least three legs. The leveling system including at least three sensor bars that act as individual digital levels adapted to be placed on top surface of the table. The leveling system including a leg movement system adapted to be attached to the table and adapted to raise and lower the legs to achieve a level top surface. The leveling system including a controller system that is connected to the sensor bars to receive data from the sensors bars and to the leg movement system to command movement of the leg movement system that is adapted to raise and lower the table, the controller system including a leveling software algorithm which inputs the data from the sensor bars and controls activation of the leg movement system.

DETAILED DESCRIPTION

Figure 1:
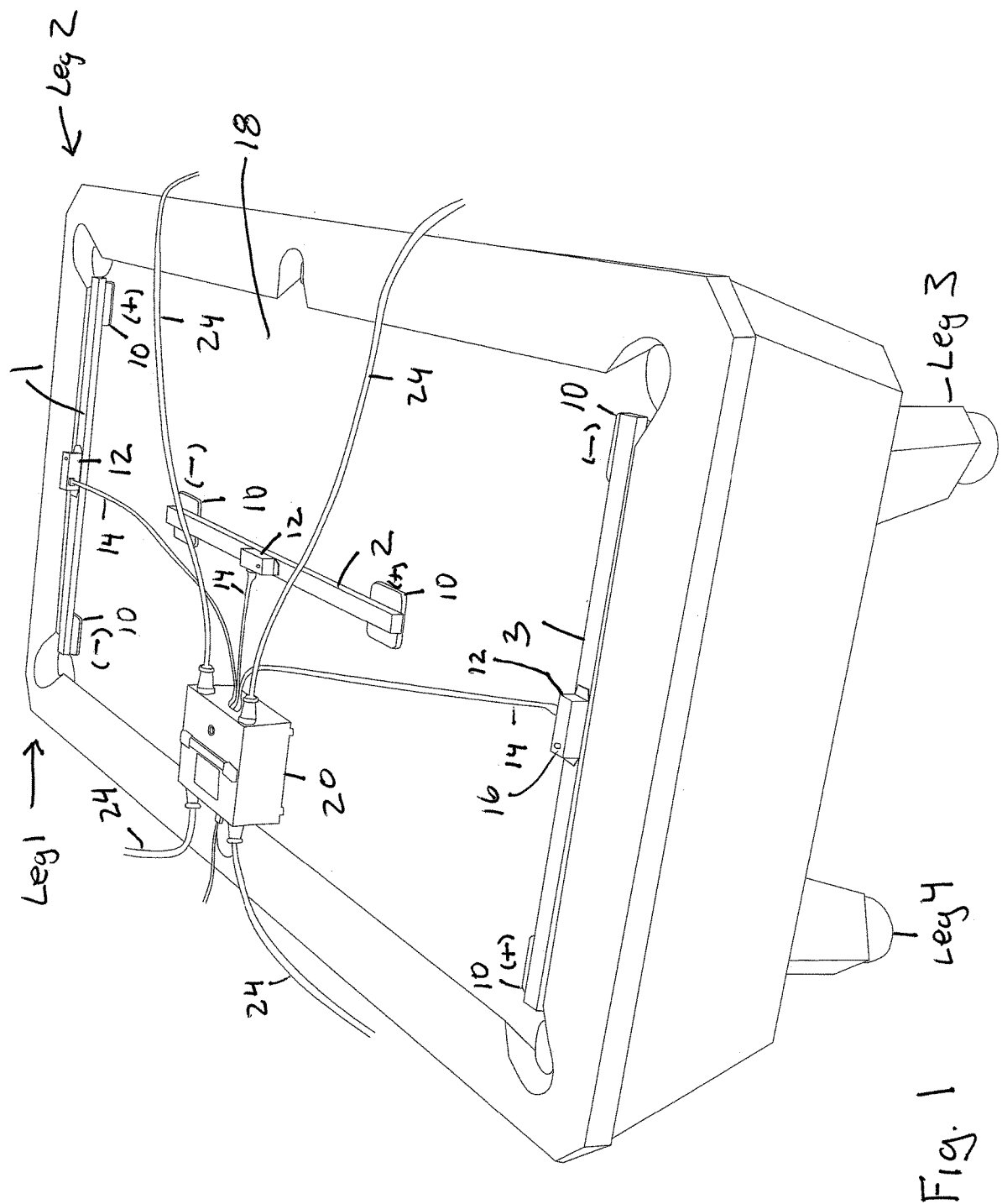
FIG. 1 is a perspective view of a leveling system according to the present invention.
Figure 2:
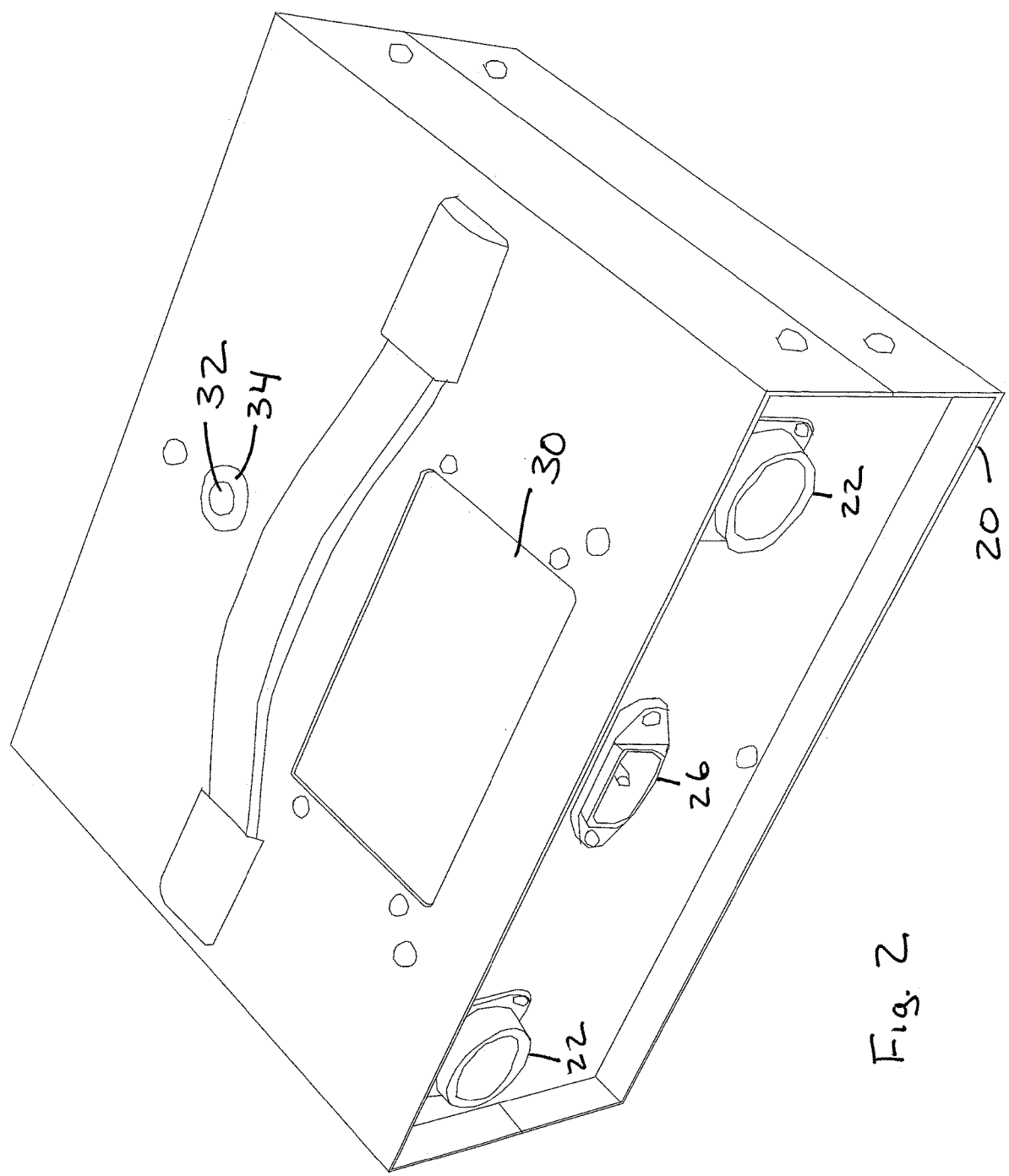
FIG. 2 is a perspective view of a controller system according to the present invention.
Figure 3:
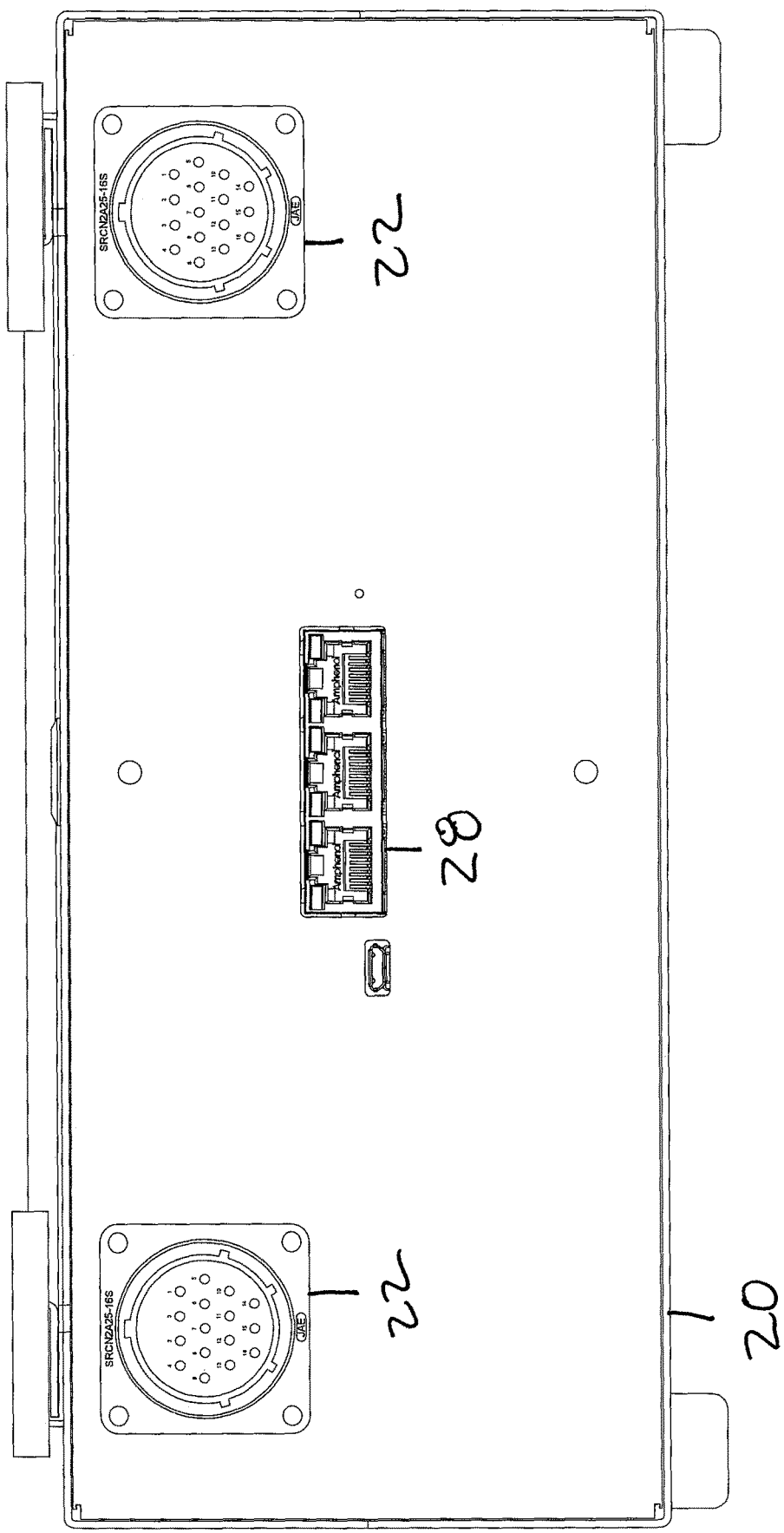
FIG. 3 is a side view of a controller system according to the present invention.
Figure 4:
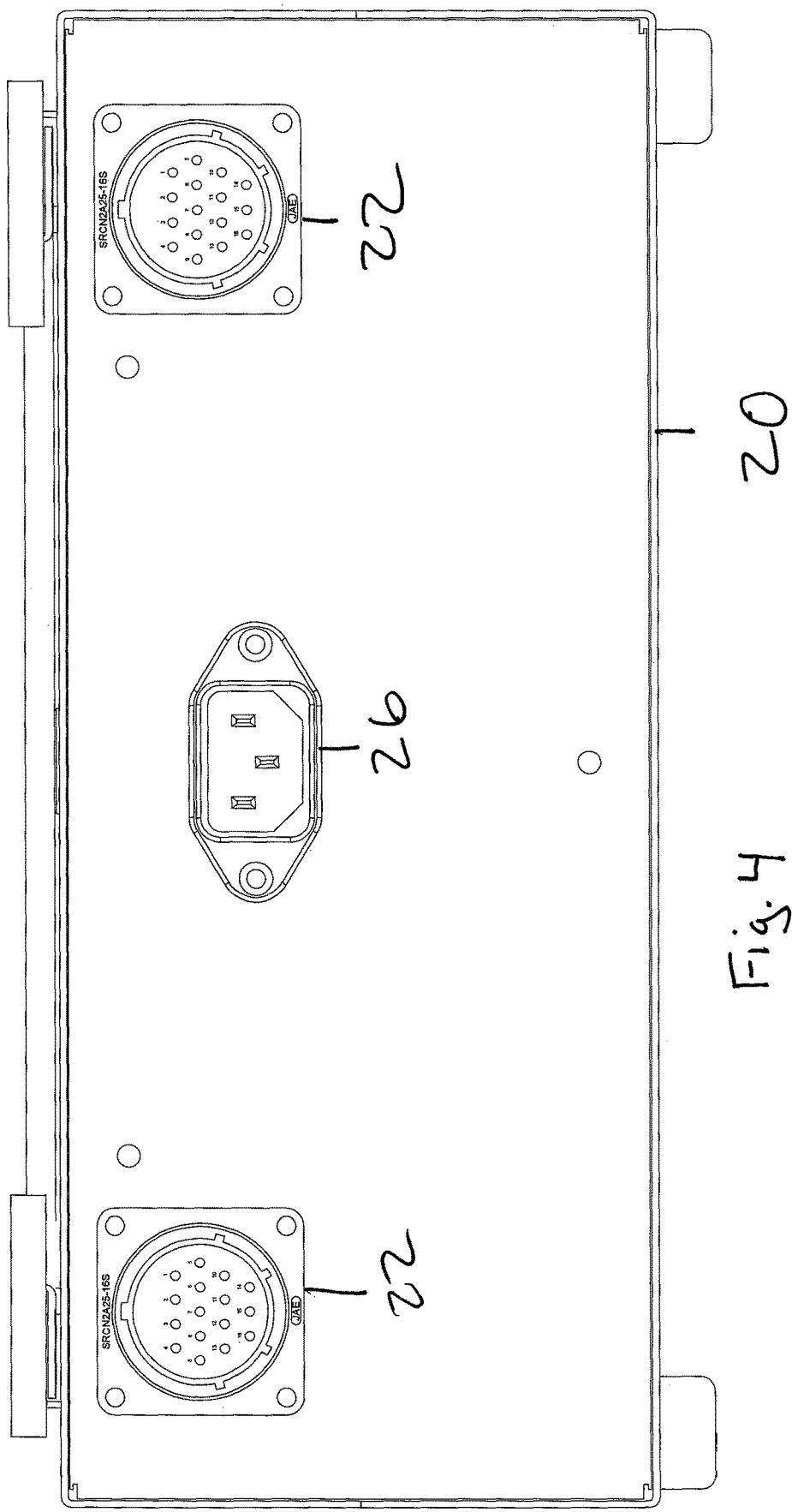
FIG. 4 is a side view of a controller system according to the present invention.

The present invention is a leveling system with different components, as show in FIGS. 1-29. The leveling system is adapted to level gaming tables, especially pool tables. The leveling system includes a sensor system, a controller system and a leg movement system. FIG. 1 shows a pool table with the sensor system and the controller system. The sensor system includes three sensor bars. FIG. 1 shows a first sensor bar 1 on a left end of the table, a second sensor bar 2 in the middle of the table and a third sensor bar 3 on a right end of the table. Each sensor bar includes a sensor foot 10 on each end of the sensor bar. Each sensor bar is shown with one foot designated as the (+) foot and one foot designated as the (−) foot. Each sensor bar includes a sensor enclosure 12 mounted on top and in the middle of the sensor bar. The sensor enclosure 12 houses an accelerometer, microcontroller and an analog to digital convertor (ADC)(not shown). The accelerometer is in the form of an inclinometer. The accelerometer in the sensor enclosure 12 senses movement of the sensor bar up and down at each foot 10 of the sensor bar. The sensor enclosure 12 includes a sensor bar cable 14 extending from the sensor enclosure 12 that is for communication between the microcontroller and the controller system and to provide power to accelerometer, microcontroller and ADC. The sensor enclosure 12 includes an indicator light 16 on the outside surface of the sensor enclosure 12. The first sensor bar 1, second sensor bar 2 and the third sensor bar 3 are placed on top of the playing surface 18, as shown in FIG. 1. Where the first sensor bar 1 and third sensor bar 3 are at the ends of the table oriented in the X direction and the second sensor bar 2 is in the middle of the table oriented in the Y direction. Whereby, the Y direction is perpendicular to the X direction. The sensor bars are used to precisely measure the inclination of the playing surface 18 in 2-dimensional directions of both the X direction and Y direction.

Figure 5:
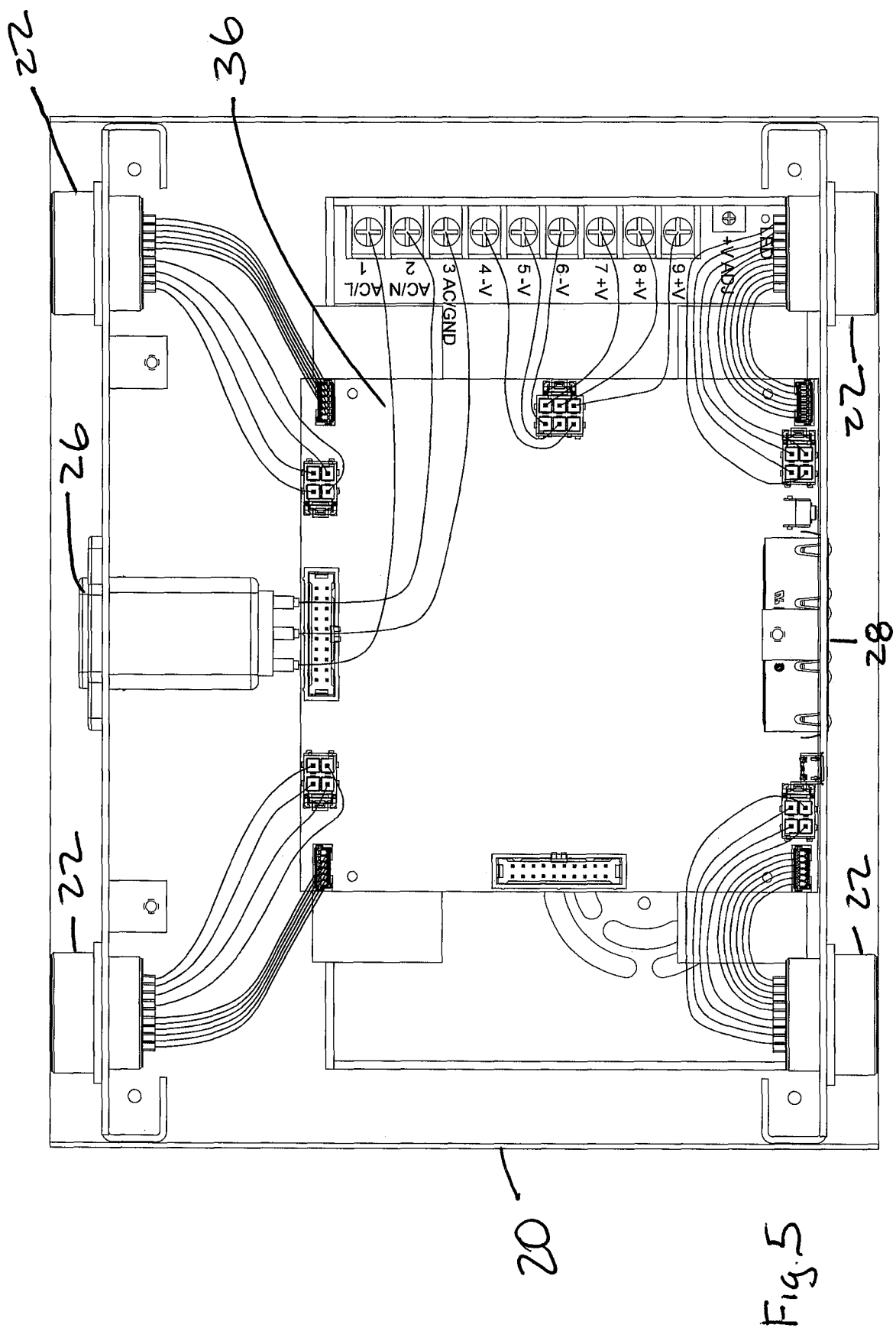
FIG. 5 is a top view of a controller system according to the present invention.
Figure 6:
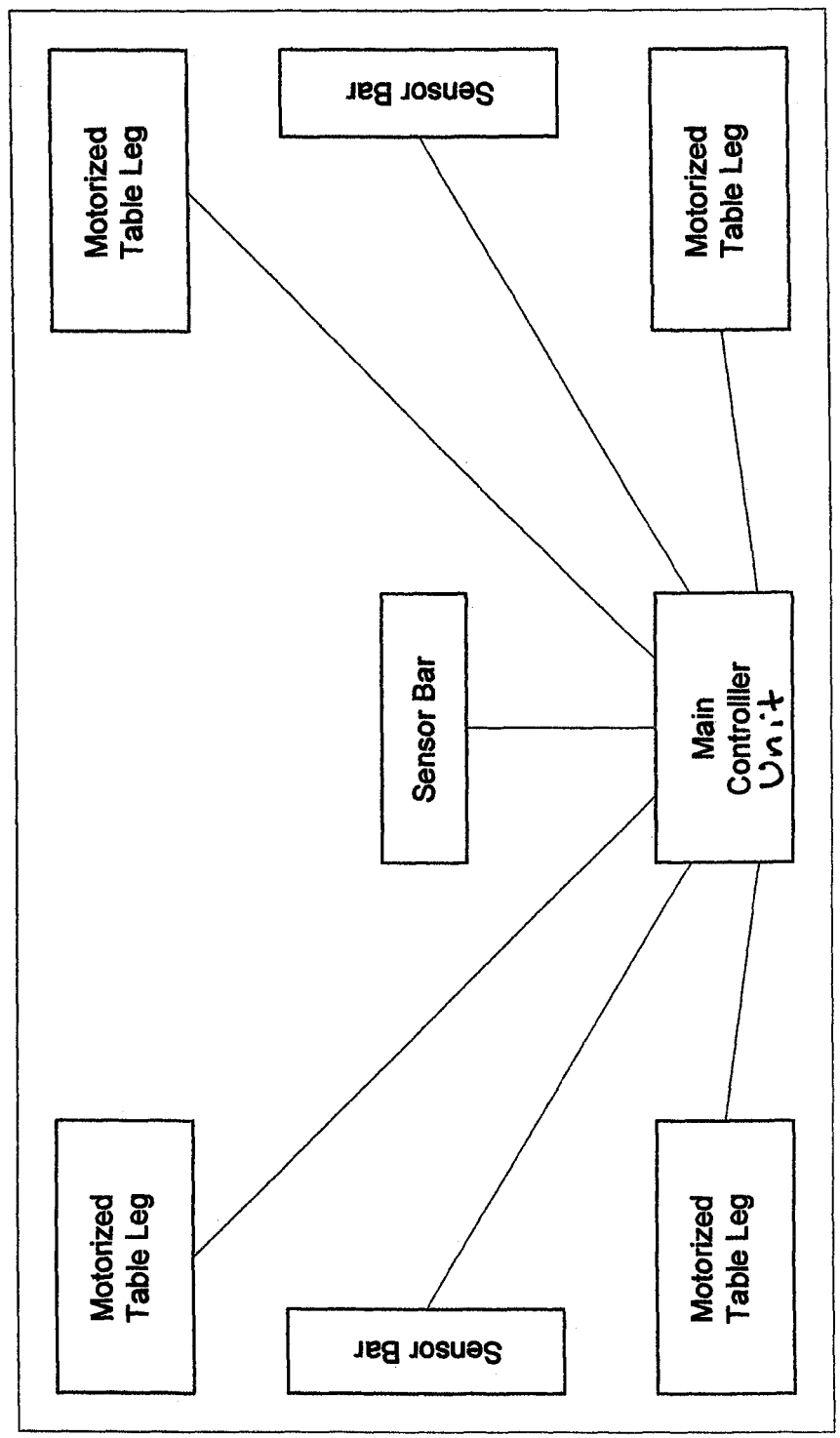
FIG. 6 is a schematic of a leveling system according to the present invention.
Figure 7:
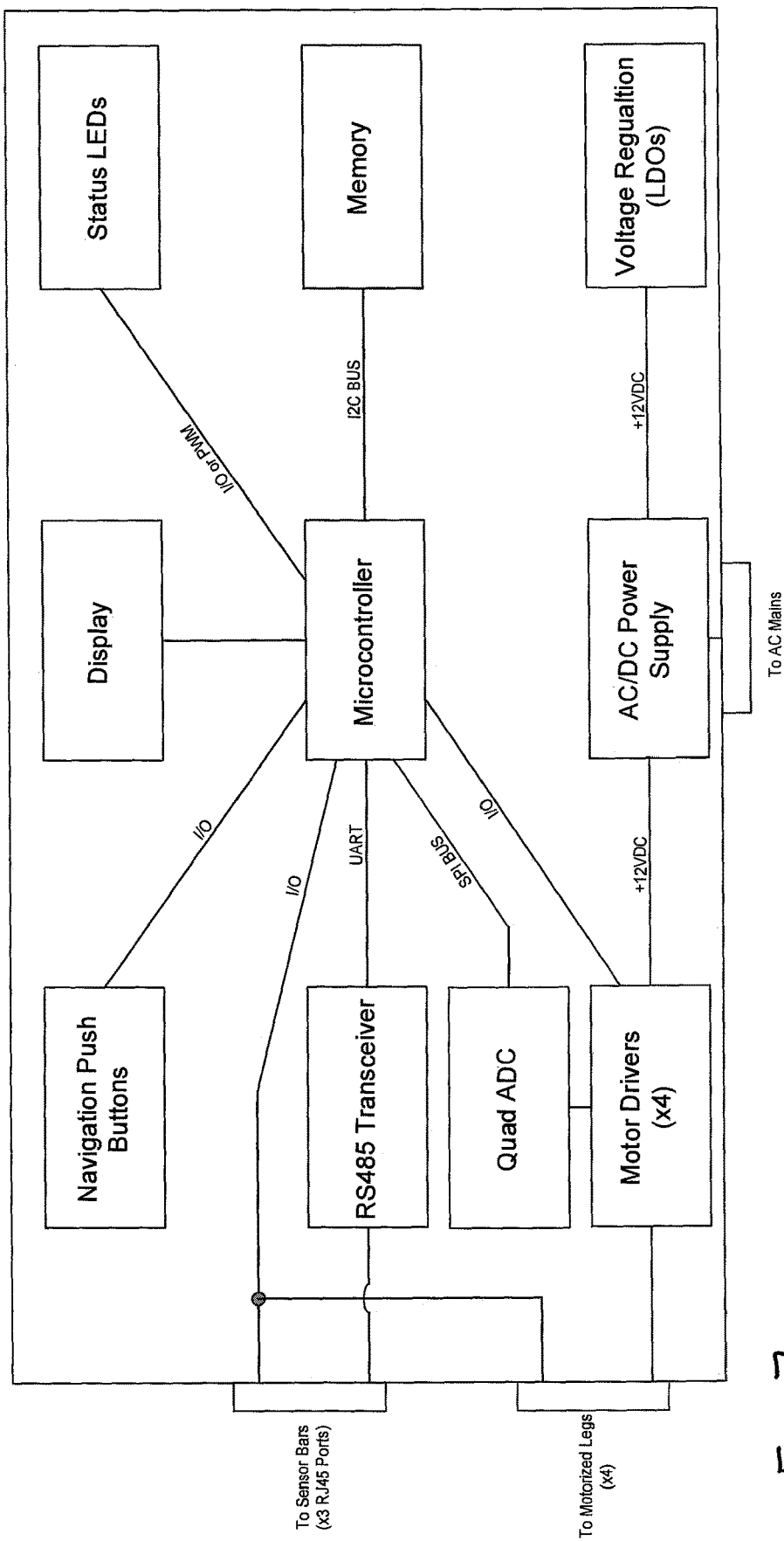
FIG. 7 is a schematic of a leveling system according to the present invention.
Figure 8:
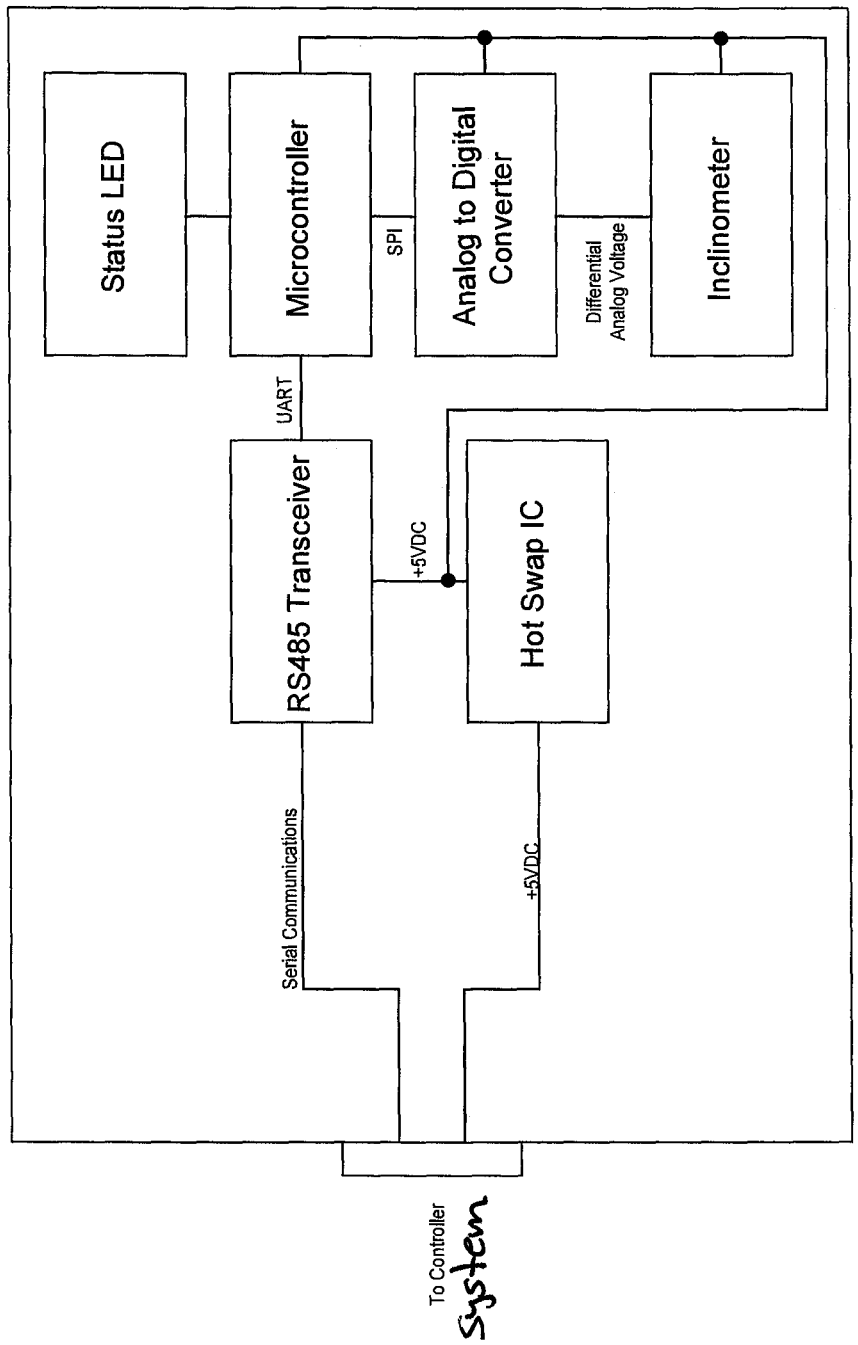
FIG. 8 is a schematic of a leveling system according to the present invention.
Figure 9:
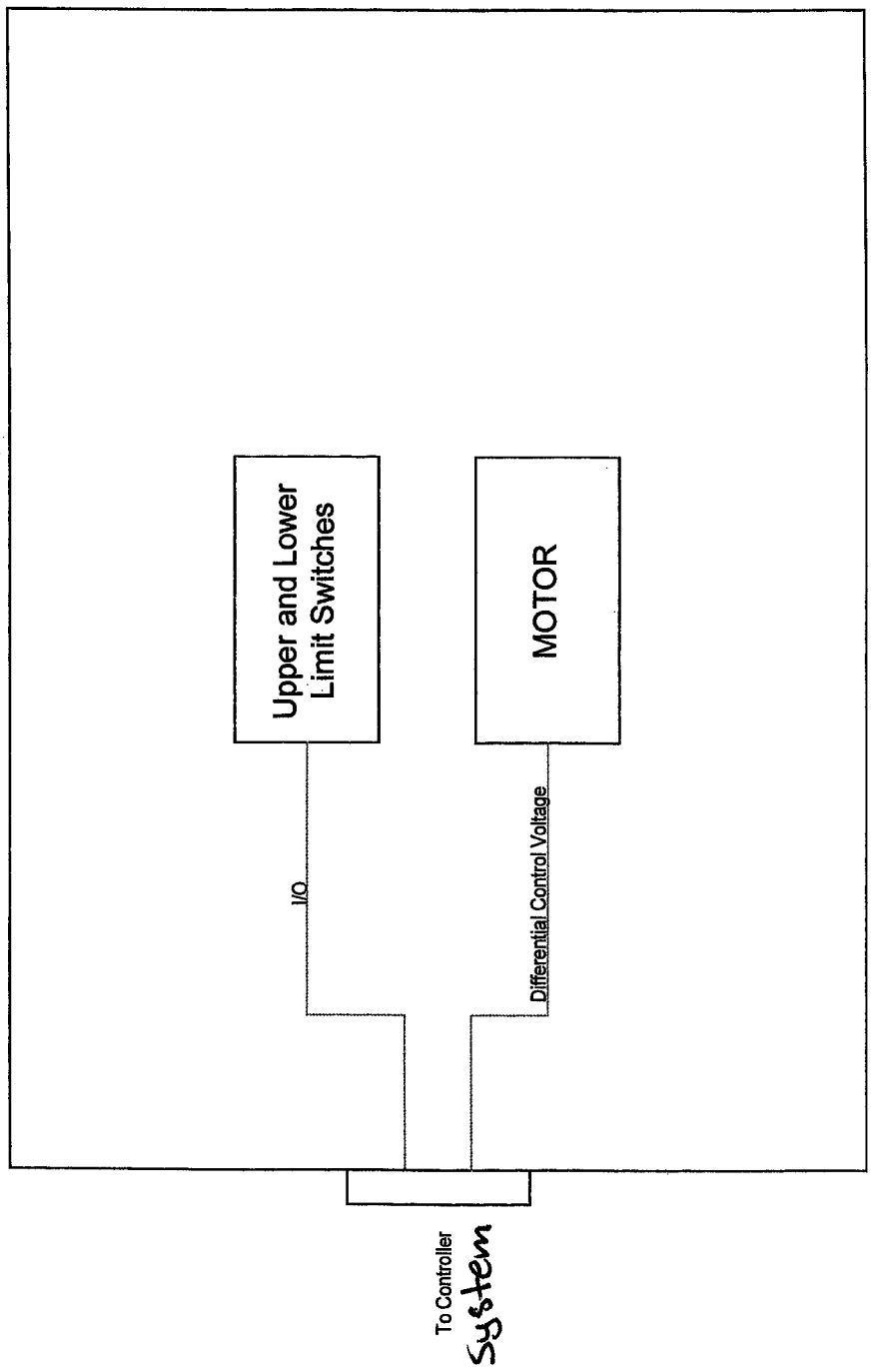
FIG. 9 is a schematic of a leveling system according to the present invention.

FIGS. 1-5 show components the controller system. The controller system includes a controller housing 20. The controller housing 20 includes four leg cable ports 22 for connection of four leg cables 24 that are also connected to the leg movement system. The controller housing 20 includes a power port 26 for connection of AC power, which is typically 110 VAC. The controller housing 20 includes three sensor ports 28 for connection of the sensor bar cables 14 that are also connected to the sensor bars. The controller housing 20 includes a display 30 that is a video touch screen to provide the user data and control of electronics. The display 30 can provide system information/function menu, inclination readings for each sensor, calibration test, calibration routine, manual motor jogging and a transportation mode. The controller housing 20 includes a main button 32 to be used to start the leveling process. The main button 32 can also be used to select run-time modes (Calibration, Discovery, Abort, Initialize). The button 32 is encircled in a RGB (Red, Green, Blue) LED indicator light 34 to be used to display status information to the user. FIG. 5 shows an internal top view of the controller housing 20 to show the controller housing 20 includes electronics 36. The electronics 36 include a microcontroller, DC motor driver integrated circuits, an analog-to-digital integrated circuit and connections for the leg cable ports, power port and sensor ports. The microcontroller is part of the main control unit (MCU). The electronics 36 includes a power supply to provide power to the electronics 36. The electronics 36 includes a software algorithm to operate and control the leveling system. FIGS. 6-9 show schematic diagrams of electrical connectivity between components of one embodiment.

The leveling software algorithm performed in the microcontroller of the controller housing 20 adjusts the leg movement system in a way that will determine the relationship between the sensor bar positions and the legs at the four corners of the table. This will allow any of the three sensor bars to be placed in any of the 3 pre-determined positions, one at each end of the table in the "X" direction and one in the middle of the table in the "Y" direction. Once initialized, each sensor bar sends data of the angle of inclination to the MCU, which is then used in software algorithm to calculate adjustment of the leg movement system. The leg movement system includes components to raise and lower each leg of the table. The results of the leveling software algorithm will provide consistent inclination accuracy on par with a precision machinist level. The leveling system will also be able to determine using software whether the gaming table is unable to be leveled due to: the table condition, poor support surface makes impossible to level, floor, etc. Since each sensor bar is fitted with a microcontroller and an ADC, the calibration data of each sensor bar can be stored internally at each sensor bar. Having a microcontroller and an ADC on each sensor bar provides that the MCU does not need to keep track of which set of calibration data goes with which sensor bar. This would eliminate the need for distinct connections of the sensor cables to the MCU. Optionally, the ADC and sensor calibration data could be stored inside the MCU and not in the sensor bars. This requires the sensor bars, and corresponding sensor cables connected between the sensor bars and MCU, to be distinctly labeled or have different electrical connectors to make sure the sensor bars are correctly connected to the MCU.

Figure 10:
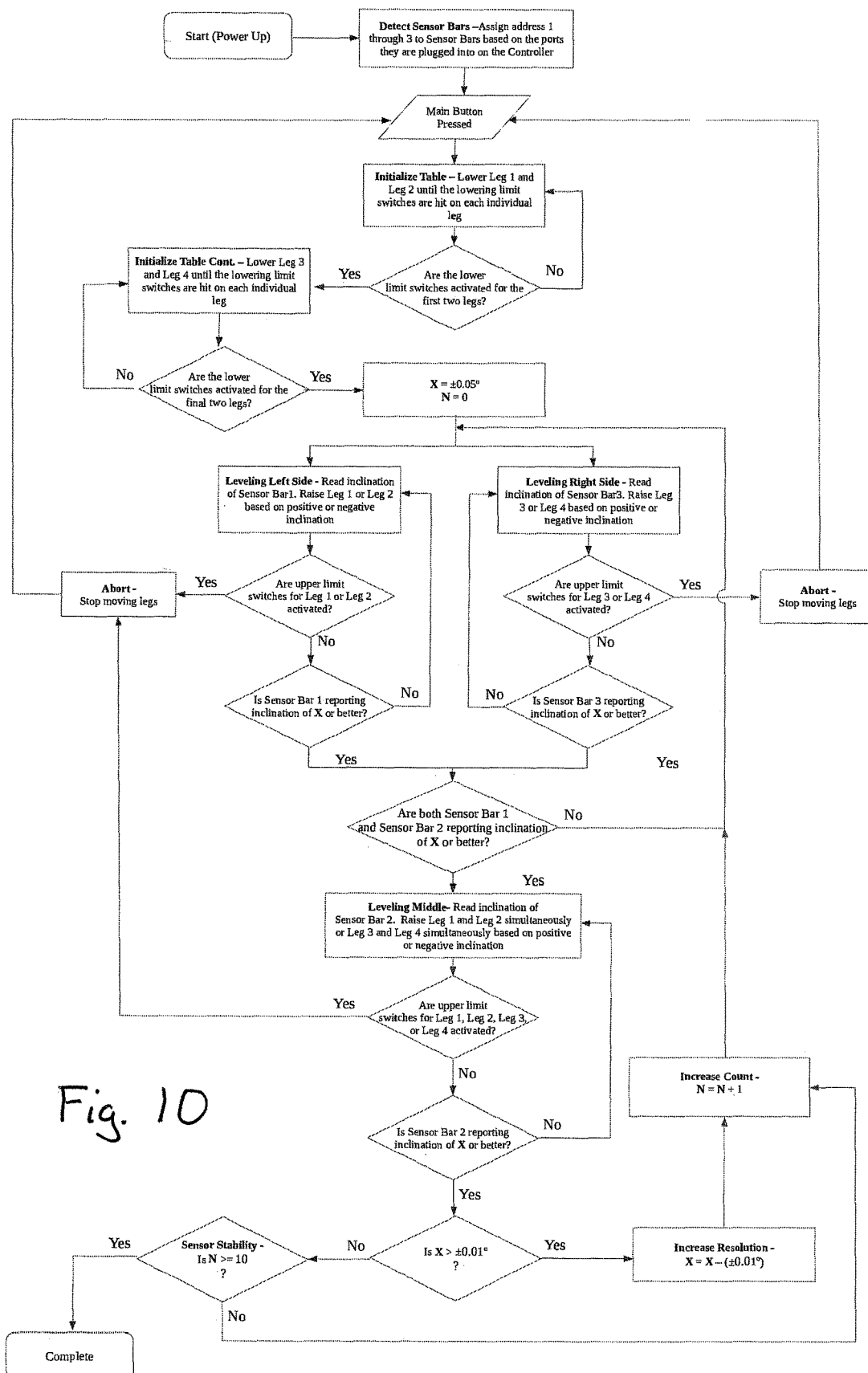
FIG. 10 is a flow chart of a leveling system algorithm according to the present invention.
Figure 11:
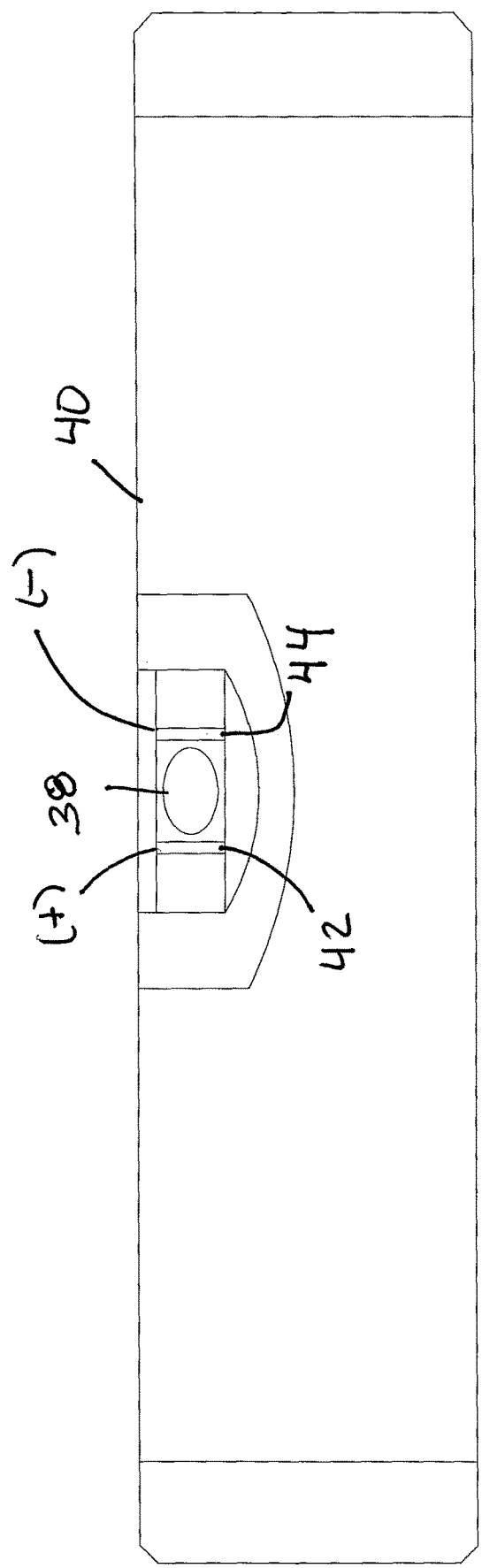
FIG. 11 is a side view of a level according to the present invention.

FIG. 10 shows a flow chart of a software algorithm that can be used from power up of the controller system to the movement of the legs to level the table. The legs in FIG. 1 are labeled to correspond to the leg labels in the flow chart of FIG. 10. The X value is the inclination accuracy value. The (+) and (−) used for the X value in the algorithm correspond to the (+) foot and (−) foot of each sensor bar. FIG. 11 shows a level bubble 38 that is typically used with a level 40. The level has two lines 42, 44 used with the bubble 38 to indicate the direction to move a surface to level the surface, where the surface is level when the bubble 38 is between the two lines 42, 44. The lines 42, 44 correspond to each foot of the sensor bar, where one line 42 of the level would be labeled (+) and one line 44 of the level would be label (−). So where the lines 42, 44 indicate the direction to level the surface with the bubble, the (+) X value or (−) X value indicates the direction to level the surface based on the position of the X value being a (+) value or a (−) value. Each sensor bar acts like a digital level, where the virtual bubble is located in center of the sensor enclosure. The on-board microprocessor reads the inclination value of the inclinometer and stores the value to be reported to the MCU. A proprietary protocol is used to transfer data between the Sensor Bar and the MCU through a RS485 link on the sensor bar cables 14. The indicator light located on the sensor enclosure can be used to indicate if the sensor bar is level to within a predetermined accuracy. All the legs and sensor bars communicate to the MCU in order to provide a complete closed loop system.

When AC power is applied to the leveling system, the system will initialize by assigning addresses (1 through 3) to the sensor bars that are connected to the controller system. The sensor bar plugged into port 1 is addressed as Sensor Bar 1, port 2 becomes Sensor Bar 2, and port 3 becomes Sensor Bar 3. All communications are done between the controller system and the sensor bars through sensor ports by means of a proprietary protocol over a RS485 communications link using the sensor bar cables 14. After initialization as part of the operating system of the master control unit (MCU), the controller system will begin a task that will poll all three Sensor Bars periodically (currently 60 ms but can be changed to increase efficiency) for inclination value data. Where the inclination values are X and the values will either be a (+) or (−), depending on the orientation of feet. The inclination value data from the sensor bars can be used by any other task when needed. It can also be displayed on the optional Touch Screen Display for the user to observe.

Next, hardware interrupts are created for a raising limit and lowering limit in each of the four legs (totaling 8 interrupts in all). The leg movement system is equipped with limit switches that indicate if each leg has reached its maximum adjustment in either direction of up and down. These signals are routed back to the MCU through the leg cables 24 and after the interrupts are created, the interrupts will interrupt the MCU's process if a limit switch has been activated. The system will now remain idle, with the only the sensor bar polling task running, until the user presses the main button 32 on the controller housing. A single push of the main button 32 will start the leveling process. The first step is to initialize the table by moving all four legs so the table is at its lowest position. Depending on the power limitation of the power supply of the controller system, two or four legs of the table can be move at one time. Whereby, a larger power supply is required to move four legs at a time, but economics and space may dictate using a smaller power supply. The following steps will be explained assuming that there is a limited power supply that can only handle moving two legs at a time. For reference purposes, please refer to FIG. 1 for locations of legs 1-4 and sensor bars 1-3. The MCU applies voltage to leg movement system at both leg 1 and leg 2 so that the table is lowered. This voltage will be supplied separately to the individual legs to operate the leg movement system at each leg. The leg movement system at each leg includes a raising limit interrupt switch and lowering limit interrupt switch. Once the lowering limit switch is activated at each individual leg, the voltage is individually turned off at that leg. Once the lowering limit switches are triggered on both leg 1 and leg 2, the process is repeated for leg 3 and leg 4.

At this point, all 4 legs have their corresponding lowering limit switches triggered. The leveling process will automatically begin. The table leveling will be done by initially running the leveling algorithm a total of 5 times. The inclination accuracy will increase with each loop of leveling algorithm until the desired value is achieved. The amount of loops and accuracy may be change to change the desired accuracy and efficiency by the user. An additional 5 loops of the leveling algorithm will be run with the desired accuracy to ensure all 3 sensor bars are settled.

The leveling algorithm shown in the flow chart of FIG. 10 will start with inclination accuracy X value of ±0.05°. The process will first level both the right end and left end of the table simultaneously, with the assumption of sensor bar 1 is assigned to the left end and sensor bar 3 is assigned to the right end of the table. Data readings from all sensor bars take place periodically through the tasks of the algorithm. If the inclination value X of sensor bar 1 is positive, then voltage is applied to the leg movement system at leg 1, so that the table will raise and make the inclination value of sensor bar 1 more negative. Conversely, if sensor bar 1 is data reading a negative inclination value X, then voltage is applied to the leg movement system at leg 2 so that the table will raise there and thereby make the inclination value of sensor bar 1 more positive. In the steps of the algorithm voltage will be continued to be applied to the corresponding leg until the inclination of sensor bar 1 provides a data reading of an accuracy within ±0.05°. If at any time the raising limit switch is activated at any of the legs, the process will abort and report an error to the user.

At the same time sensor bar 1 is being leveled to within an accuracy of ±0.05°, sensor bar 3 will also attempt to achieve the same accuracy. If the inclination value X of sensor bar 3 is positive, then voltage is applied to the leg movement system at leg 3 so that the table will raise and thereby make the inclination value X of sensor bar 3 more negative. Conversely, if sensor bar 3 data reading is a negative inclination value X, then voltage is applied to the leg movement system at leg 4 so that the table will raise there and thereby make the inclination value of sensor bar 3 more positive. In the steps of the algorithm voltage will be continued to be applied to the corresponding leg until the inclination value X of sensor bar 1 is reading within an accuracy within ±0.05°. If at any time the raising limit switch is activated in any of the legs, the process will abort and report an error to the user.

When the process of leveling both the sensor bar 1 and sensor bar 3 to within the initial ±0.05° is complete, then the sensor bar 2 on the table will be leveled to inclination value X within ±0.05°. Readings of X values from all sensor bars are taking place periodically through the algorithm tasks of leveling sensor bar 2. If the inclination value X of sensor bar 2 is positive, voltage is applied leg movement system at leg 1 and leg 2 simultaneously so that the table will rise to make the inclination value X of sensor bar 2 more negative. Conversely, if sensor bar 2 is reading a negative inclination value X, voltage is applied to the leg movement system at leg 3 and leg 4 simultaneously so that the table will rise to make the inclination of sensor bar 2 more positive. In the steps of the algorithm voltage will be continued to be applied to the corresponding legs until the inclination value X of sensor bar 2 is reading with an accuracy within ±0.05°. If at any time the raising limit switch is activated in any of the legs, the process will abort and report an error to the user. This will complete the first loop of the 5 loops of the leveling algorithm. In the next loop the desired accuracy of the inclination is increased to ±0.04° and the loop of leveling the right and left ends, then the middle is repeated. Repetition this loop and increasing the accuracy of inclination by ±0.01° until ±0.01° is achieved on all 3 sensor bars provides the 5 loops. To ensure stability and to minimize any error in leveling, the leveling algorithm is repeated an additional five times with the accuracy of ±0.01°. At the end of these five loops, the process is complete. Notification of completion to the user can be done through an indicator light or the display.

The software algorithm could also include an auto-discovery algorithm of legs of the table and the sensor bars, so that it will not matter what port they are plugged into on the controller system. One way to perform the auto-discovery of legs of the table and the sensor bars is as follows. With all of the leg cables and sensor bar cables connected to the controller system and the three sensor bars positioned on the table as shown in FIG. 1, first lower all legs so the table is in the lowest position. Second, send addresses to sensor bars, where the sensor bar connected to port 1 becomes sensor bar 1, port 2 becomes sensor bar 2, port 3 becomes sensor bar 3. The addresses sent are communication protocol functions of the auto discovery algorithm. Third, apply voltage to raise leg "A", making sure there is a spike in current draw on the DC motor driver integrated circuit. Fourth, repeat this for leg "B", leg "C" and leg "D", so that all legs are on the surface supporting the table. Fifth, take a data point snapshot of the inclination (±angle) of sensor bar 1, sensor bar 2, sensor bar 3. Sixth, raise leg "A" for 5 seconds and compare angles on sensor bar 1, sensor bar 2, and sensor bar 3 to the original data point snapshot from fifth step. Sixth, note which sensor bar (1, 2 or 3) that has the largest change in angle to which leg "A" can now be associated with that sensor bar, while noting whether the change in angle is more negative or more positive. It is now known when leg "A" is being raised, this sensor bar will change either more negative or more positive. Seventh, lower leg "A" for 5 seconds to return to the starting point and repeat steps 5 through 6 for leg "B", leg "C", and leg "D", so that all four legs are associated with making one of the sensor bar's angle more positive or more negative. At this point, only two of the three sensor bars will have data associated and become known, which are the two sensor bars on the short ends of the table. Eighth, chose one of the two sensor bars that have been associated and simultaneously raise two of the legs that have been associated with the same sensor bar, for 5 seconds. Compare the angle of the third sensor bar, which is the sensor bar that has not been associated yet, with the data point snapshot of Step 5. Note whether the angle became more negative or more positive. It is now established that when these two legs are raised, third sensor bar will become more negative or more positive. Associate the remaining two legs to the opposite direction (positive or negative) of the third sensor bar. Ninth, is an optional step to assign labels that can be used in reference to flowchart of FIG. 10. It is known, from step 7, the two sensor bars that are located on the short ends of the table. Take the first sensor bar (lowest numerical address)

and label the leg that made that sensor bar more negative when raised as "leg 1". Associate the leg that made the same sensor bar more positive when raised as "leg 2". Now observe the second, short end sensor bar from step 7 and label the leg that made the sensor bar more negative when raised as "leg 3". The remaining leg should be responsible for making this second sensor bar more positive when raised and should be labeled "leg 4".

Figure 12:
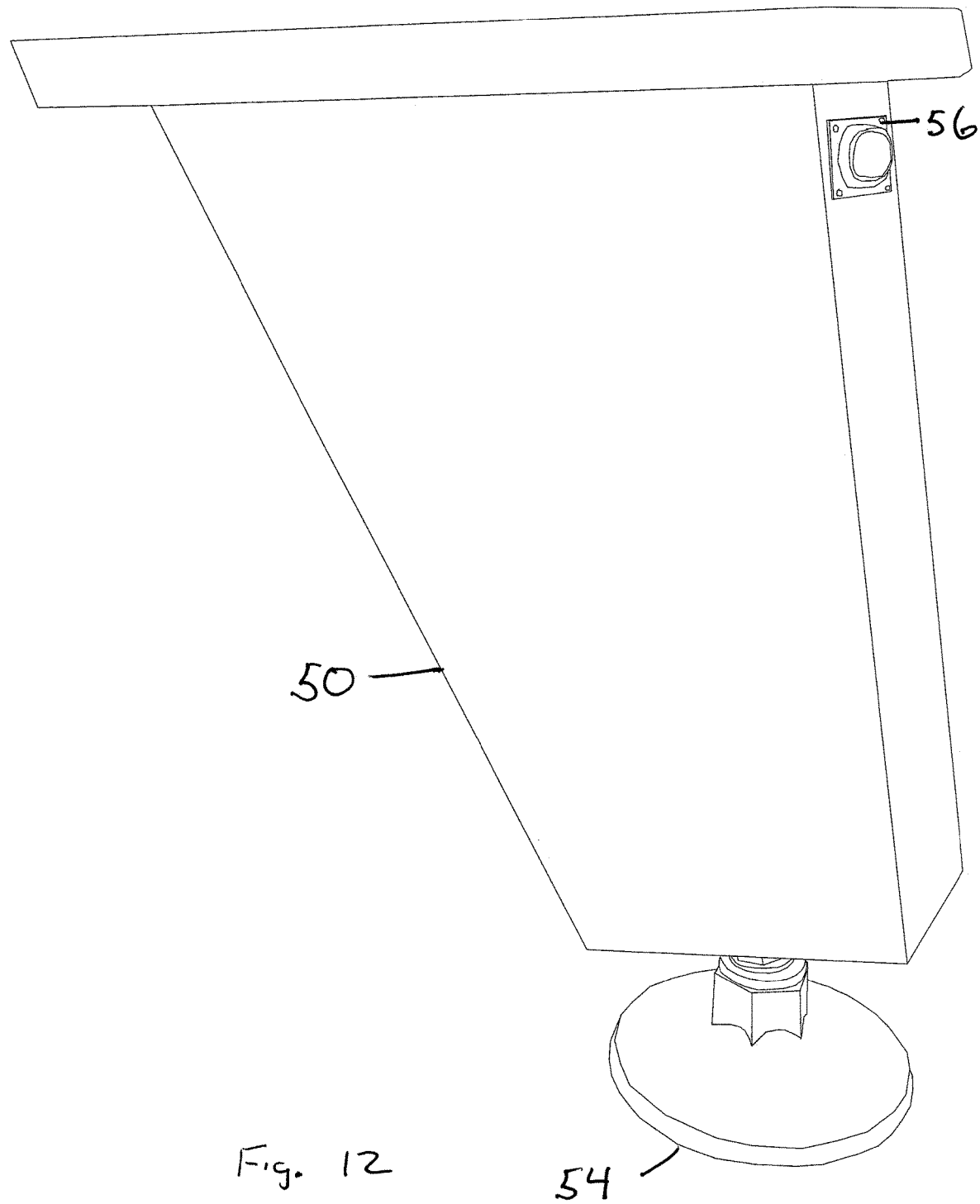
FIG. 12 is a perspective view of a leg according to the present invention.
Figure 13:
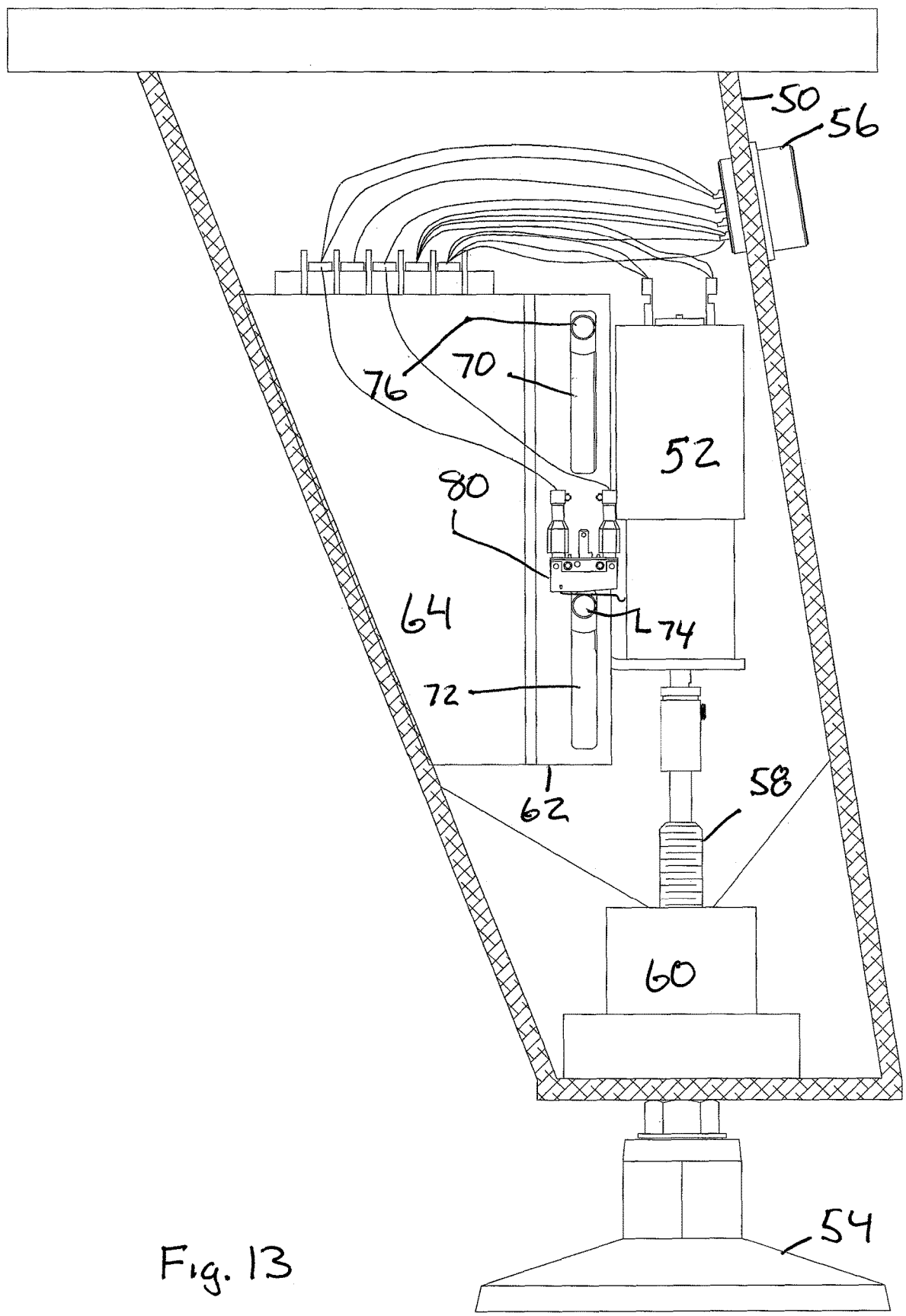
FIG. 13 is a cutaway side view of a leg movement system to the present invention.
Figure 14:
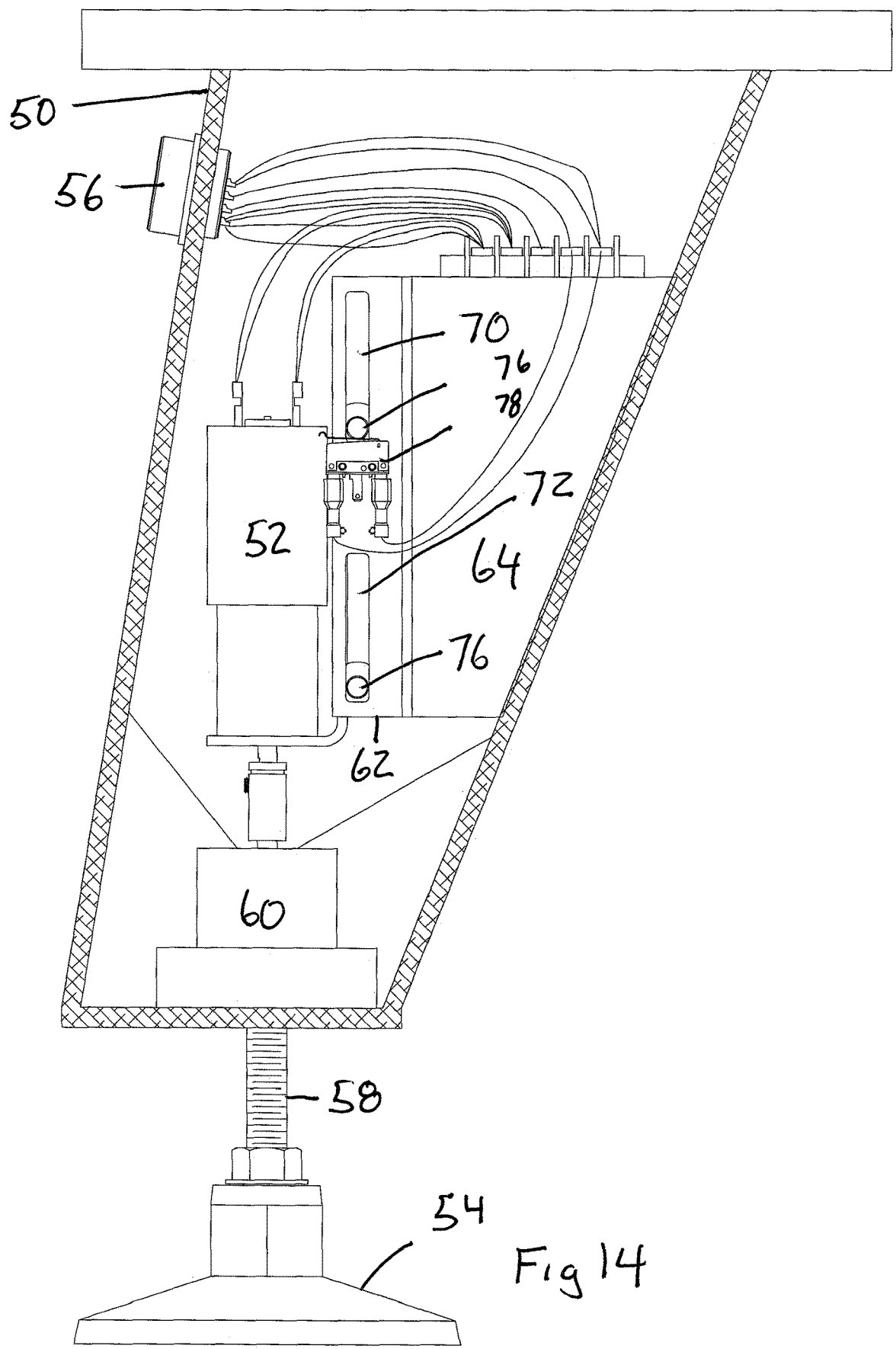
FIG. 14 is a cutaway side view of a leg movement system to the present invention.
Figure 15:
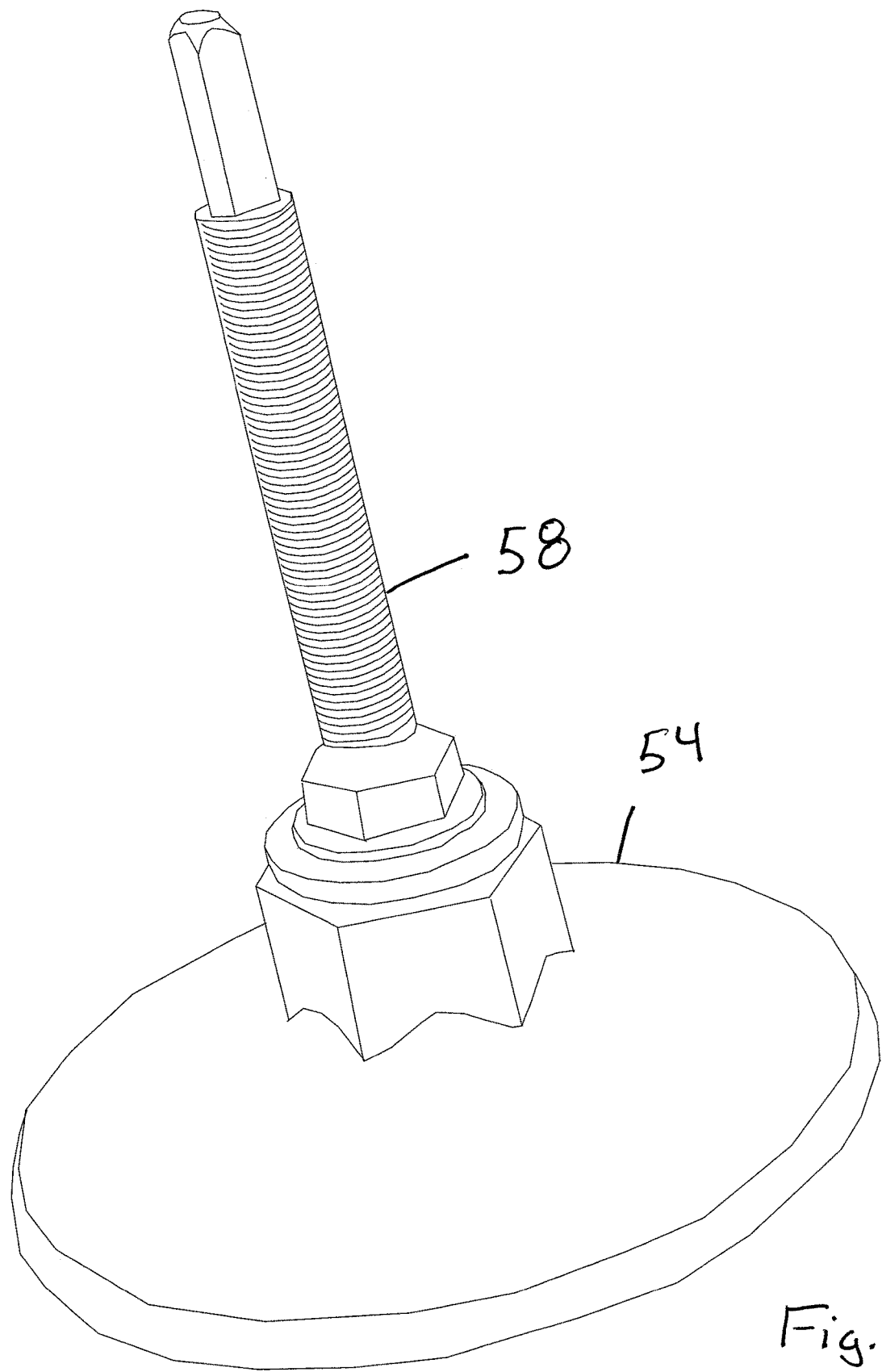
FIG. 15 is a perspective view of a drive bolt according to the present invention.
Figure 16:
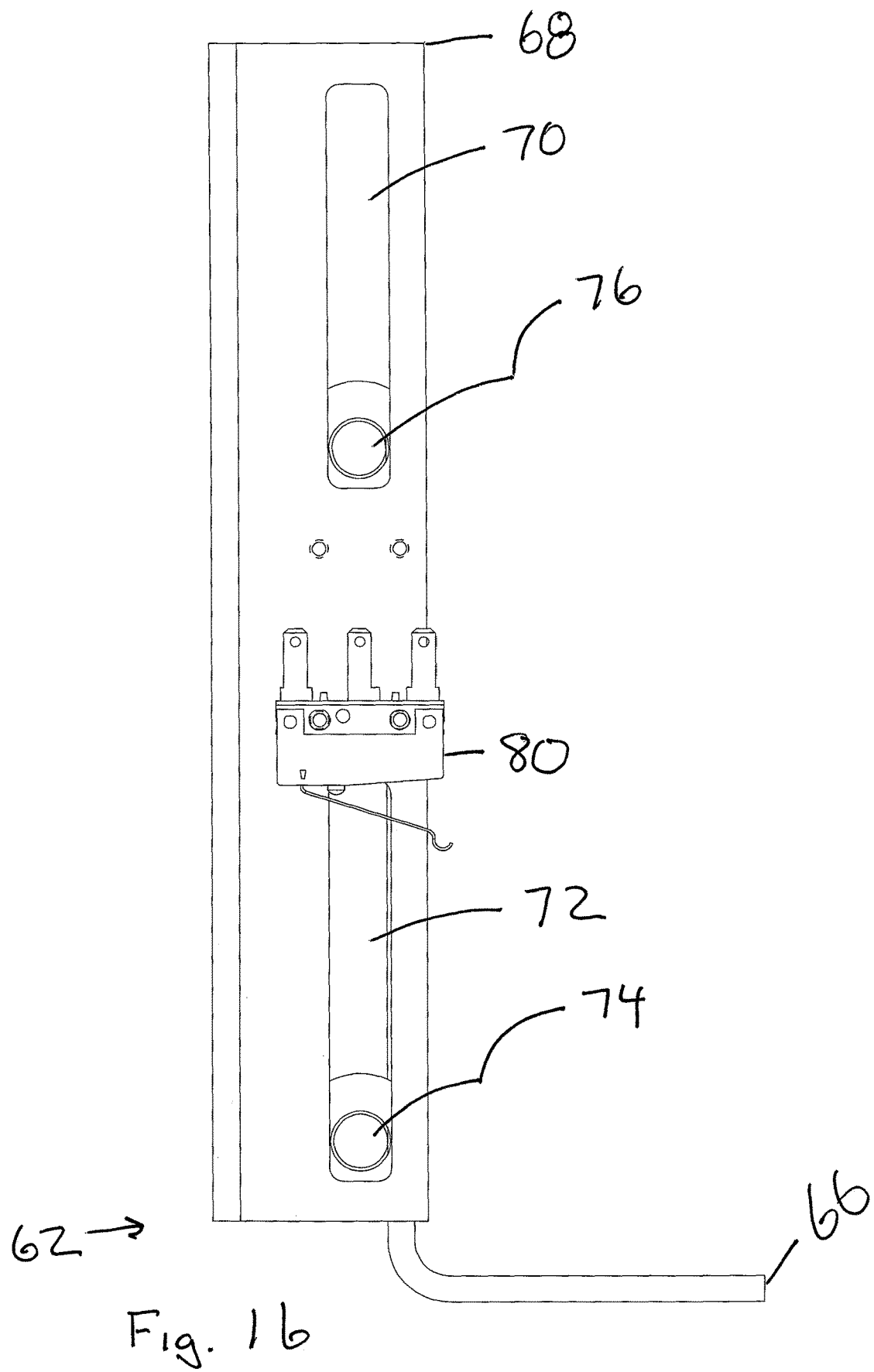
FIG. 16 is a side view of a motor mount according to the present invention.
Figure 17:
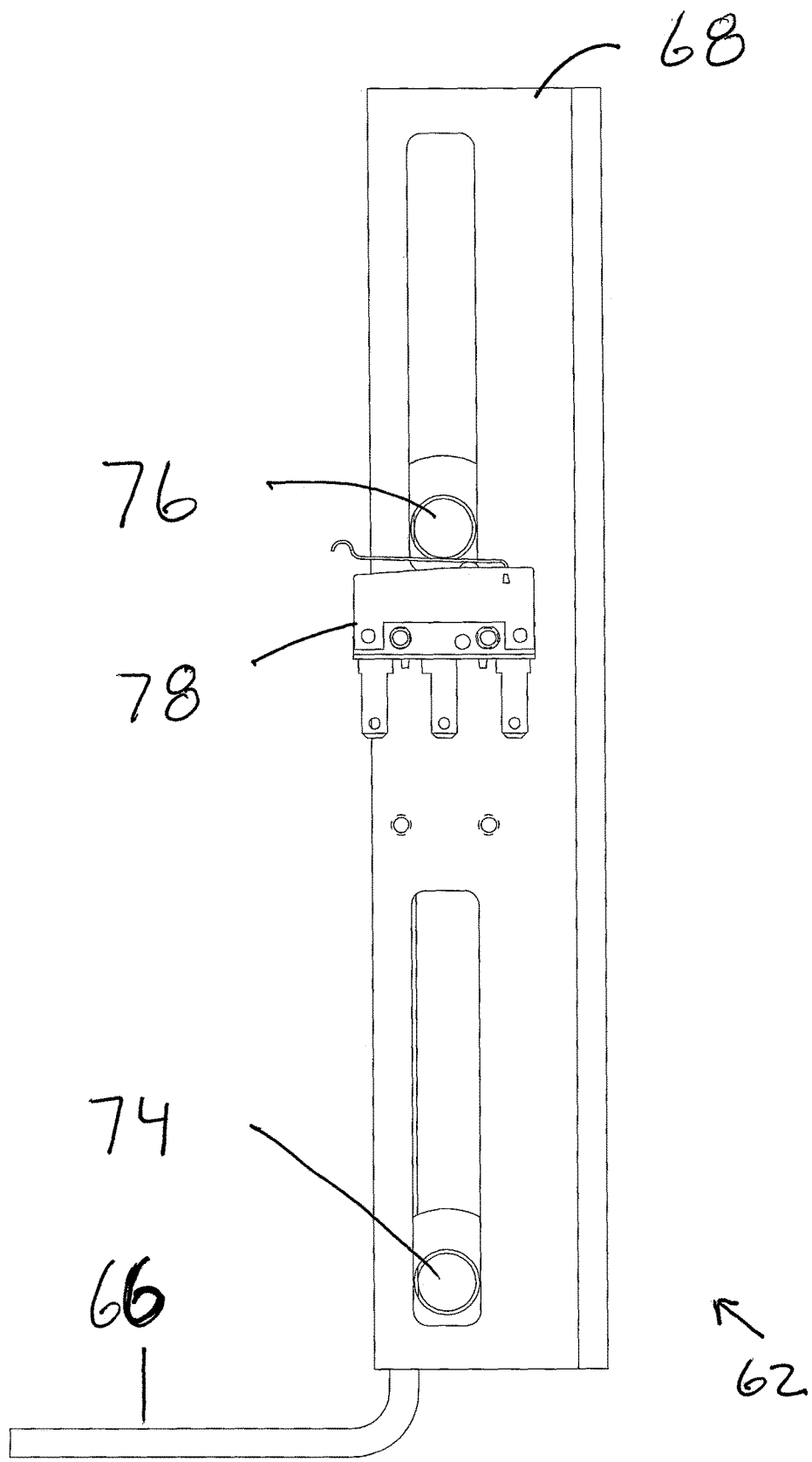
FIG. 17 is a side view of a motor mount according to the present invention.
Figure 18:
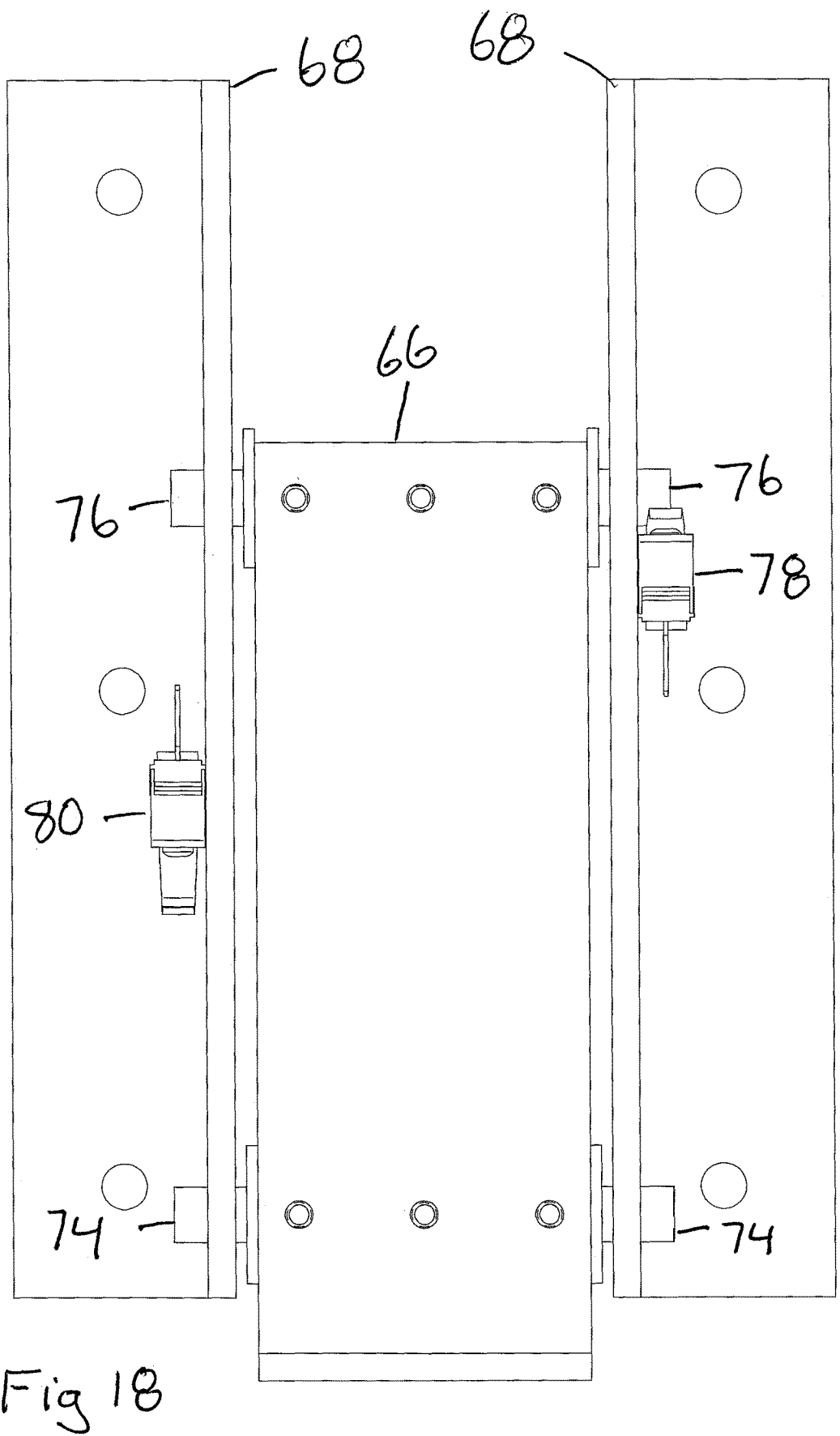
FIG. 18 is a front view of a motor mount according to the present invention.

A first embodiment of the leg movement system is shown in FIGS. 12-18. The first embodiment includes motorized legs at each corner of the table, where each leg 50 of the table includes a motor 52 to adjust leg height. FIG. 12 shows an example of one of the legs supported by a leg foot 54. FIG. 12 also shows a leg cable port 56. Each motorized leg utilizes a DC gear motor 52 mounted within the leg 50 and mated to a drive bolt 58 in FIGS. 13-14. The drive bolt 58 is threaded and screws thru a position nut 60 secured in the bottom of the leg 50. The drive bolt 58 is connected to the foot 54 that is used to makes contact with the surface that supports the table, as shown in FIG. 15. The drive bolt 58 is supported by the foot 54 using a thrust bearing inside the foot 54. Support by the thrust bearing allows the drive bolt 58 to turn freely about the foot 54 without the foot 54 also turning. The motor 52 is attached to a motor support 62 mounted to a leg support 64 in the leg 50, as shown in FIGS. 14-15. The motor 52 is attached so that the motor 52 can travels up and down within the leg 50 along the motor support 62, so that the motor 52 can move with the drive bolt 58. FIGS. 16-18 show the motor support 62. The motor support 62 includes a motor carrier 66 attached between two motor carrier side mounts 68. Each motor carrier side mount 68 attaches to the leg support 64. Each motor carrier side mount 68 includes an upper travel slot 70 and lower travel slot 72. The motor carrier 66 includes two upper slide pins 76 and two lower slide pins 74. The upper slide pins 76 ride in the upper travel slots 70 and the lower slide pins 74 ride in the lower travel slots 72, which allow the motor carrier 66 to move up and down the length of the travel slots 70, 72. The motor 52 is mounted to the motor carrier 66, so the motor 52 can travel up and down the length of the travel slots 70, 72. Each motor carrier side mount 68 includes a limit switch. FIG. 18 shows an upper limit switch 78 which may be engaged by one of the upper slide pins 76 and a lower limit switch 80 which may be engaged by one of the lower slide pins 74. The upper limit switch 78 and the lower limit switch 80 are used to prevent over travel by the motor 52 and hence the drive bolt 58.

The motor 52 is connected to the leg cable port 56 of the leg 50. The leg cable port 56 provides power to the motor 52. Each leg cable 24 connects the motor 52 of each leg 50 to the MCU of the controller system. The MCU sends power to each motor 52 to turn the drive bolts 58 in order to raise and lower the leg 50. For example, FIG. 14 shows the leg 50 in the lowest position. When the motor 52 in the leg 50 is activated by the MCU, the motor 52 will be commanded to turn the drive bolt 58 in the direction that causes the leg 50 to rise due to the relationship between the drive bolt 58 and the position nut 60. The position of the drive bolt 58 in the position nut 60 determines the amount of the drive bolt 58 that extends out from the bottom of the leg 50. So as the drive bolt 58 screws out of the bottom of the leg 50, the leg 50 rises along the drive bolt 58 due to the foot 54 having contact with a support surface, as shown in FIG. 15. The reverse is true when the leg 50 is to be lowered. The leg 50 is lowered by commanding the motor 52 to turn the drive bolt 58 so that the drive bolt 58 retracts into the leg 50 and the leg 50 moves downward along the drive bolt 58. The feet 54 are mechanically adjustable with a wrench and are removable. This will allow the user to still be able to adjust the height of the legs 50 without the need for the motorized legs to be operational. The motor 52 can also be mounted to an outside mount (not shown) that attaches to the outside of the leg 50 in a removable manner. The leg cable port 56 would be mounted to the outside mount and so would the position nut 60. The position of the drive bolt 58 in the position nut 60 determines the amount of the drive bolt 58 that extends out from the bottom of the leg 50. So as the drive bolt 58 screws out of the bottom of the leg 50, the leg 50 rises along the drive bolt 58 due to the foot 54 having contact with a support surface, as shown in FIG. 15. The reverse is true when the leg 50 is to be lowered. The leg 50 is lower by commanding the motor 52 to turn the drive bolt 58 so that the drive bolt 58 retracts into the leg 50, so that the leg 50 moves downward along the drive bolt 58. Over travel upward by the leg 50 is prevented when the upper limit switch 78 is engaged by the upper slide pin 76. Over travel downward by the leg 50 is prevented when the lower limit switch 80 is engaged by the lower slide pin 74.

Figure 19:
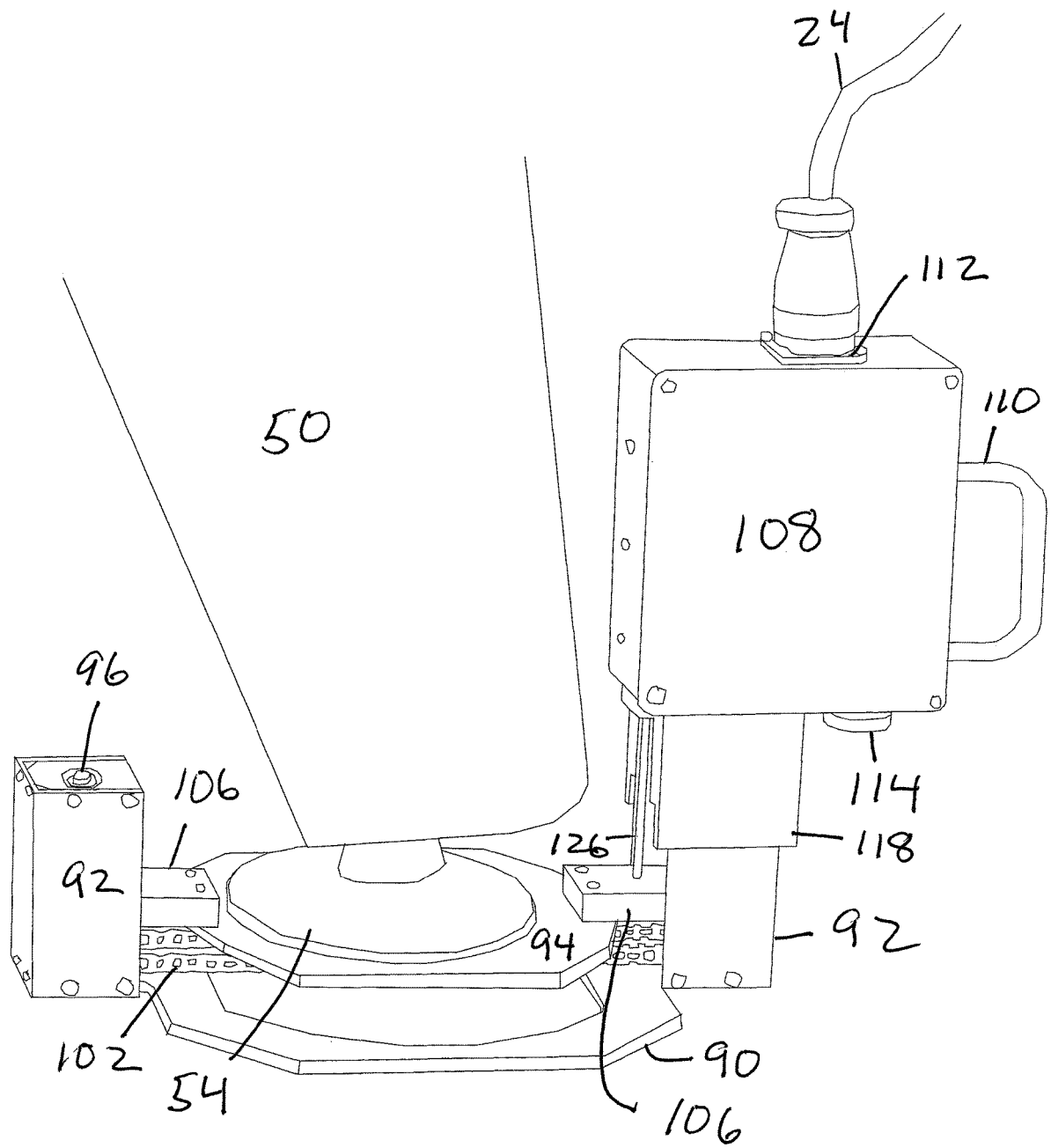
FIG. 19 is a perspective view of a leg movement system according to the present invention.
Figure 20:
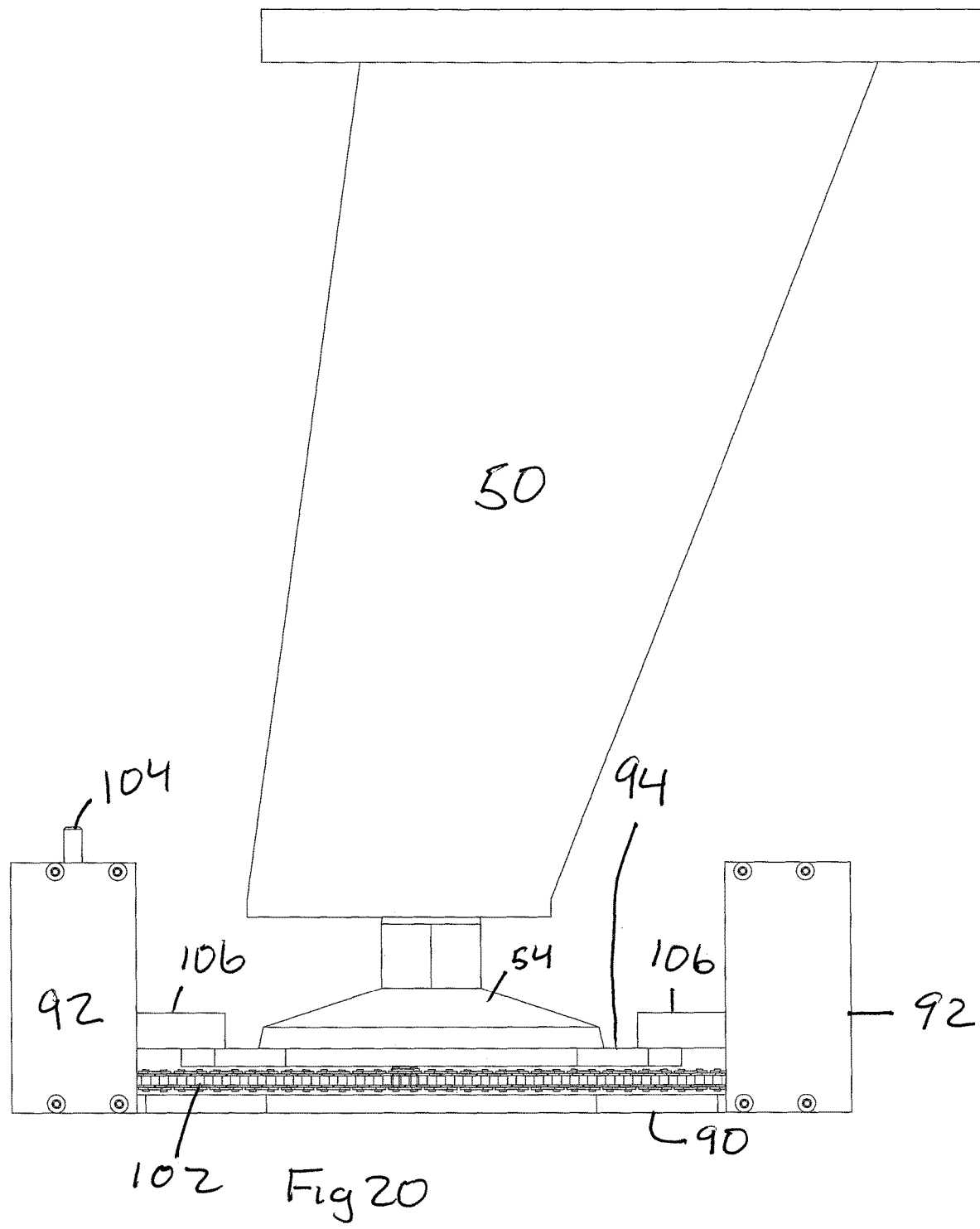
FIG. 20 is a side view of a leg movement system according to the present invention.
Figure 21:
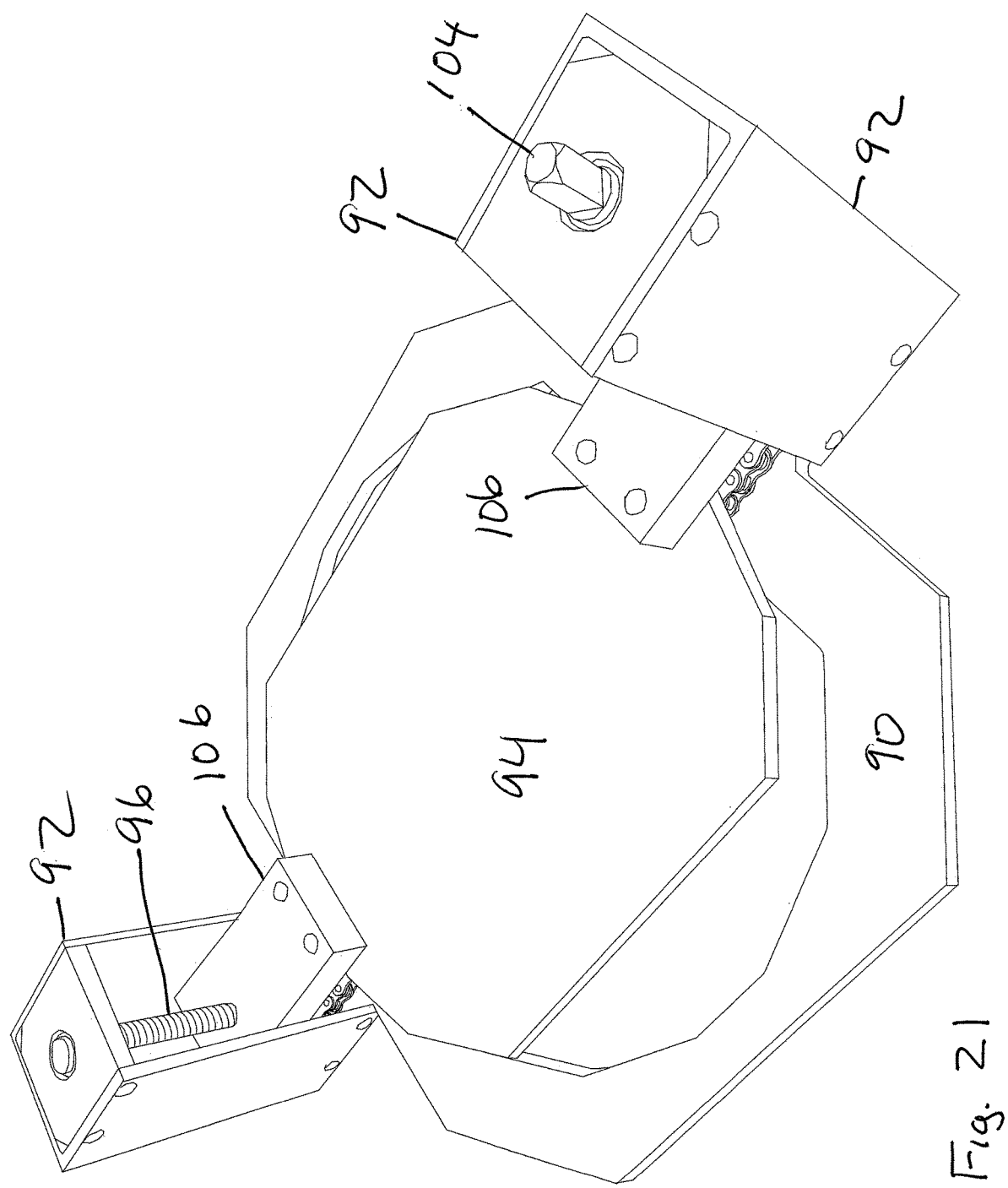
FIG. 21 is a perspective view of a leg movement system according to the present invention.
Figure 22:
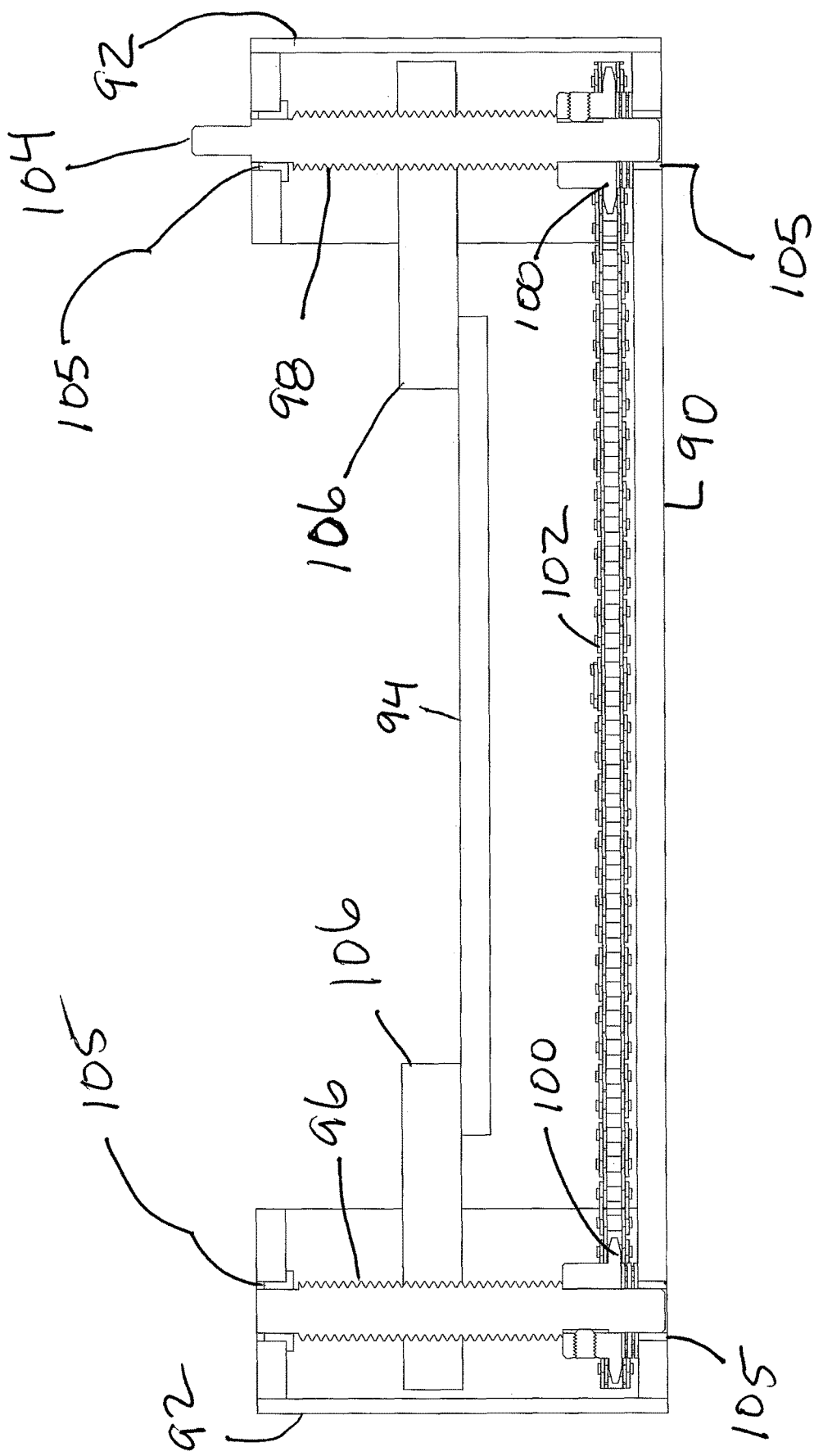
FIG. 22 is a cutaway side view of a leg movement system according to the present invention.
Figure 23:
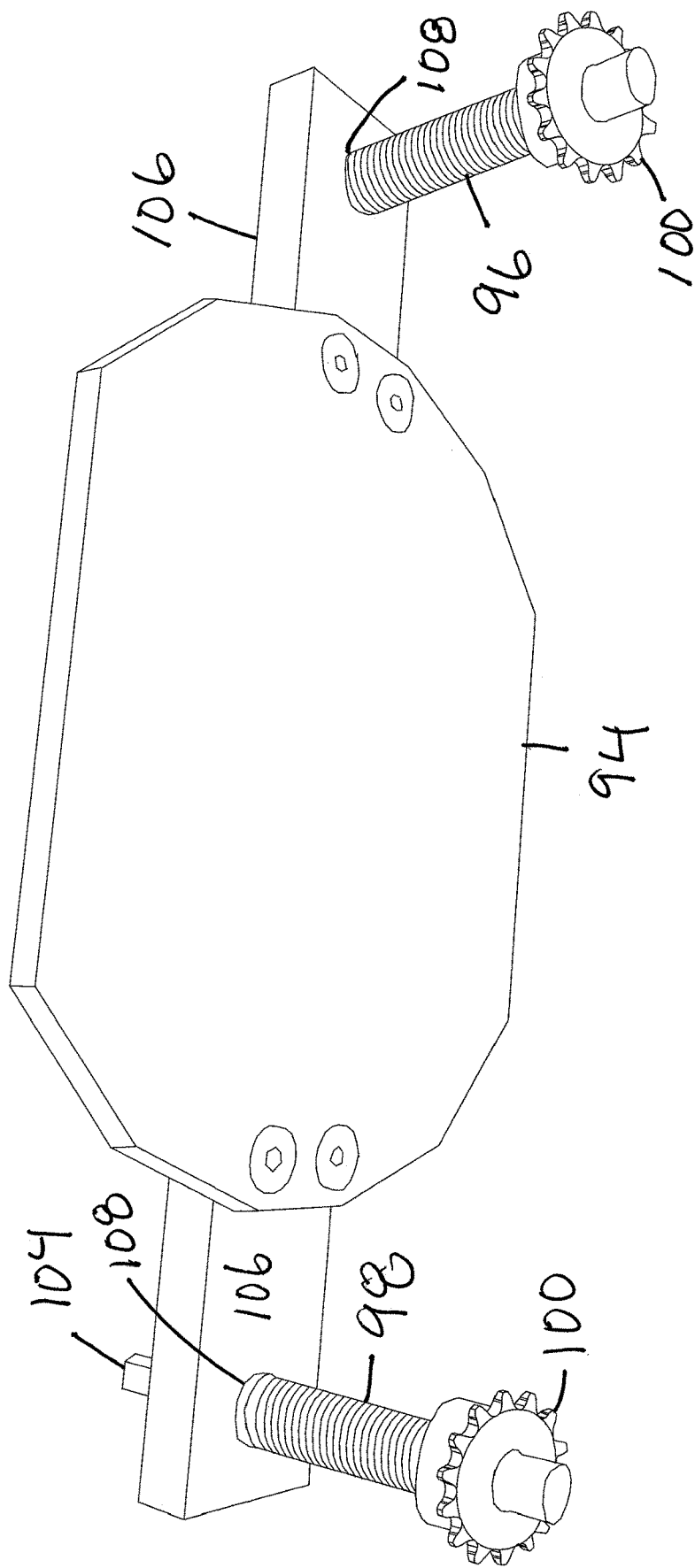
FIG. 23 is a perspective view of a leg movement system according to the present invention.

A second embodiment of the leg movement system is shown with its components in FIGS. 19-29. The second embodiment includes a motorized external jack system for each leg 50, as shown in FIG. 19. The motorized external jack system includes a jack assembly and motor assembly. FIGS. 20-29 show components of the jack assembly without the motor assembly. The jack assembly includes a base plate 90, two jack towers 92, drive assembly and a foot plate 94. As shown in FIGS. 19-20, the foot 54 of the leg 50 of the table is positioned on the foot plate 94 of the jack assembly. The base plate 90 contacts the surface that supports the leg 50 of the table. Each end of the base plate 60 includes one of the jack towers 92 extending upward. The drive assembly includes a jack screw 96, drive screw 98, chain sprockets 100 and a chain 102, as shown in 22. The jack screw 96 is rotatably mounted in a first jack tower 92 and the drive screw 98 is rotatably mounted in a second jack tower 92. Each jack tower 92 includes bearings 105 to hold the jack screw 96 and drive screw 98 in place and allow rotation of the jack screw 96 and drive screw 98. The chain sprockets 100 are fixed one each to the jack screw 96 and drive screw 98, as shown in FIG. 23. The chain 102 is attached between the chain sprockets 100, so that movement of one sprocket 100 causes movement of the chain 102 and movement of the other sprocket 100. The drive screw 98 includes a drive shaft 104 extending upward from the second jack tower 90, such that rotation of the drive shaft 104 causes rotation of the drive screw 98. Rotation of the drive screw 98 causes rotation of the sprocket 100 on the drive screw 98, which in turn causes rotation of the sprocket 100 on the jack screw 96 due to the connection of the chain 100. Rotation of the sprocket 100 on the jack screw 96 causes rotation of the jack screw 96.

The foot plate 94 includes two nut plates 106 attached to the foot plate 94, as shown in FIGS. 22-23. Each nut plate 106 includes a threaded hole 108 to receive the threads of the jack screw 96 and the drive screw 98. As the drive screw 98 rotates within the nut plate 106, the rotation of the drive screw 98 causes the nut plate 106 to move either up or down along the drive screw 98, depending on the direction of the rotation of the drive screw 98. While the drive screw 98 is rotating, the jack screw 96 rotates due to the chain connection 102. Rotation of the jack screw 96 causes the nut plate 106 attached to the jack screw 96 to move either up or down along the jack screw 96, depending on the direction of the rotation of the jack screw 96. Since the foot plate 94 is attached to the nut plates 106, rotation of the drive screw 98 causes movement of the foot plate 94, due to the movement of the nut plates 106 along the jack screw 96 and the drive screw 98.

Figure 24:
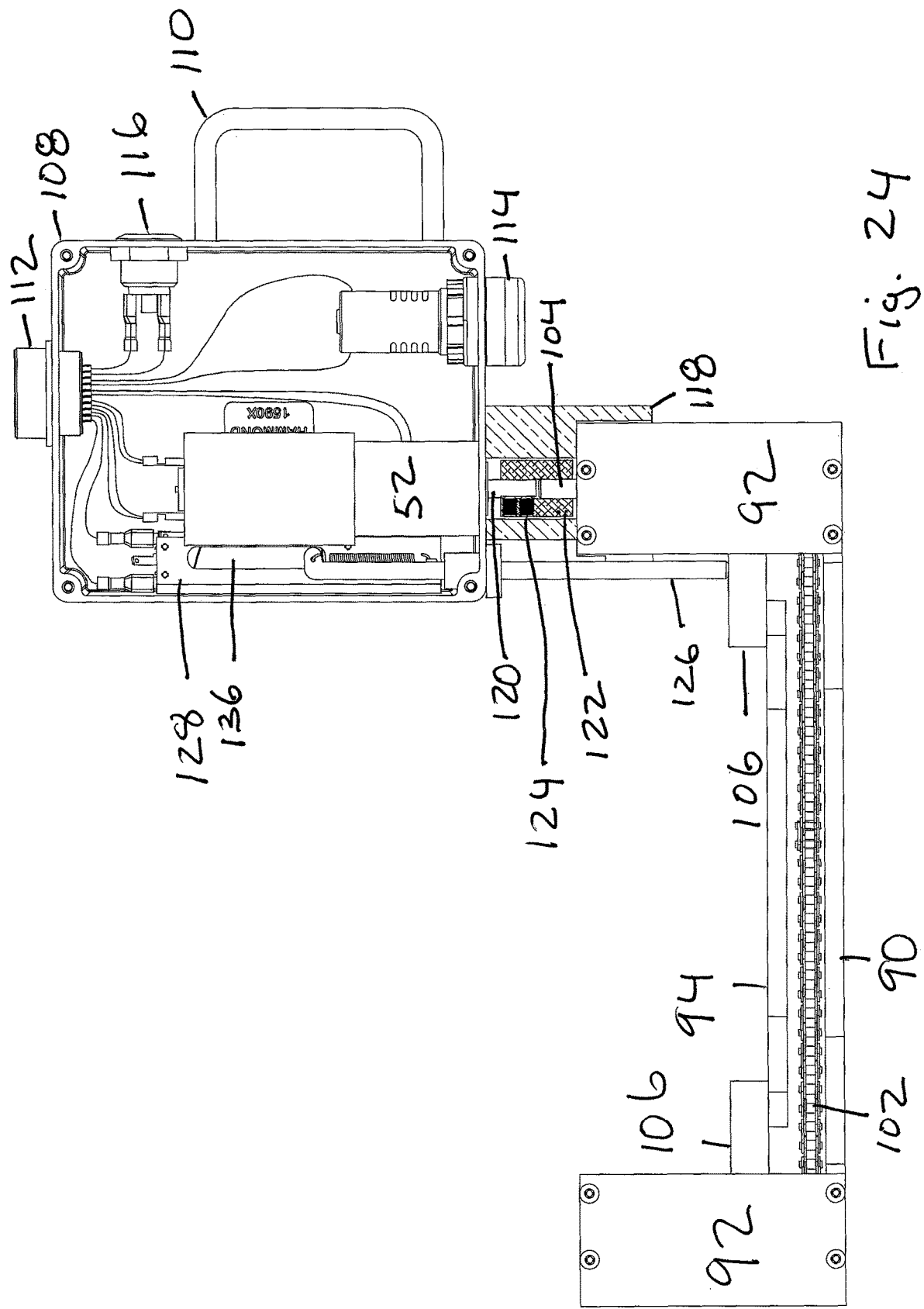
FIG. 24 is a cutaway side view of a leg movement system according to the present invention.
Figure 25:
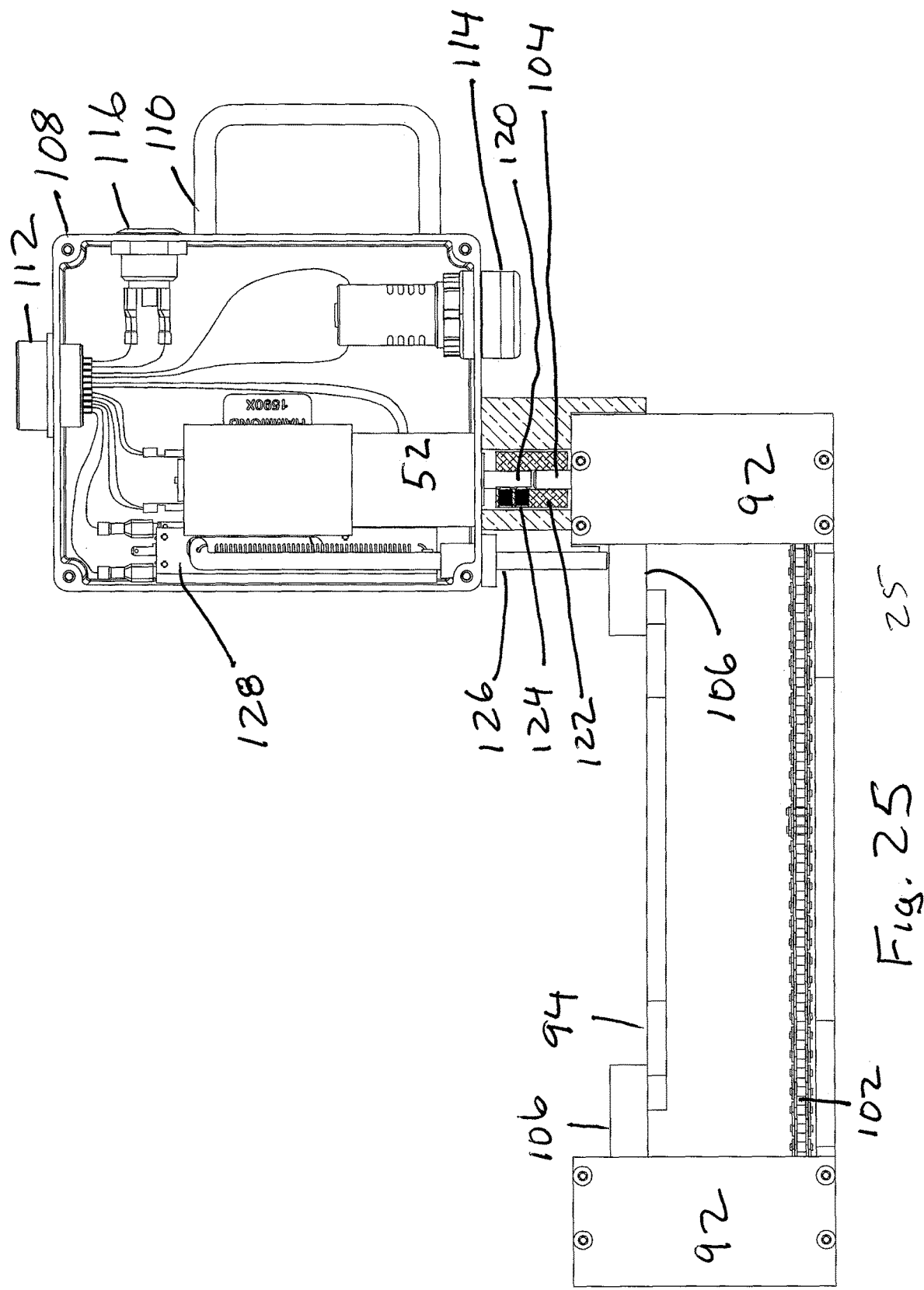
FIG. 25 is a cutaway side view of a leg movement system according to the present invention.
Figure 26:
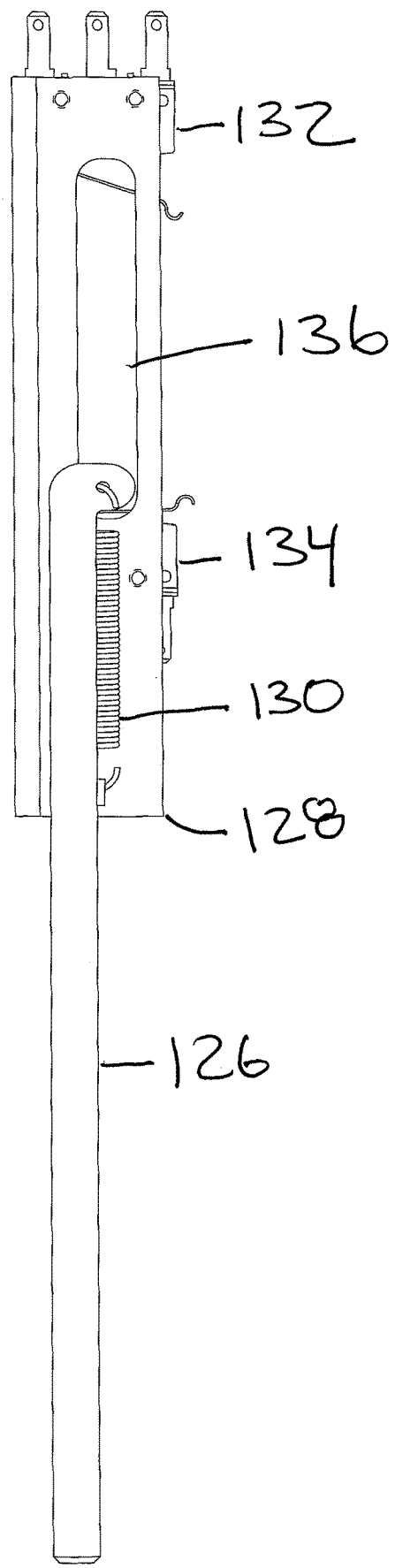
FIG. 26 is a side view of a limit switch assembly according to the present invention.
Figure 27:
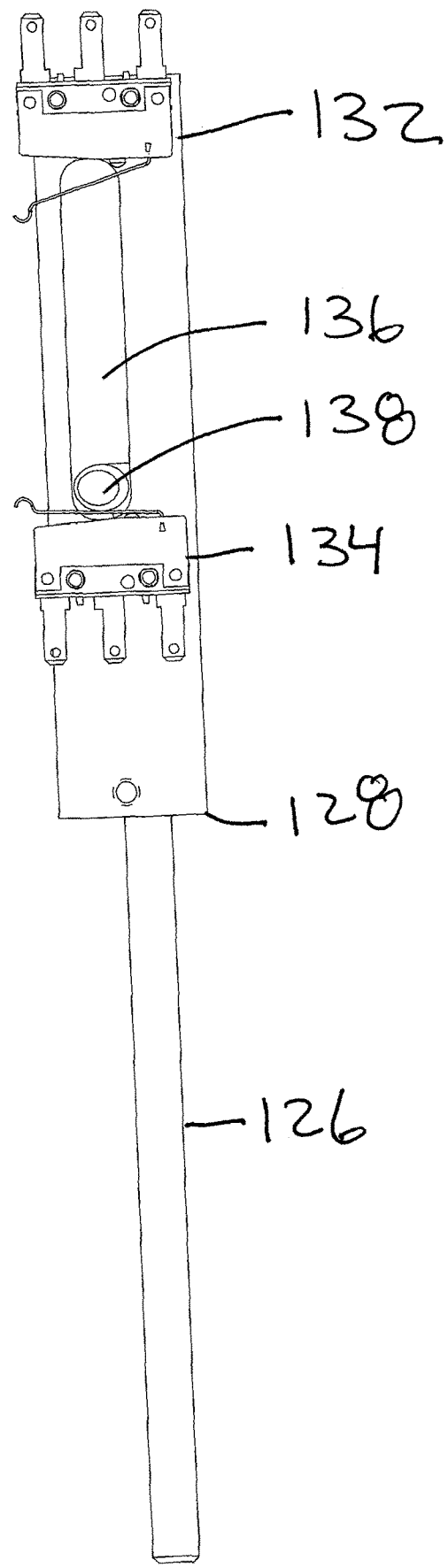
FIG. 27 is a side view of a limit switch assembly according to the present invention.
Figure 28:
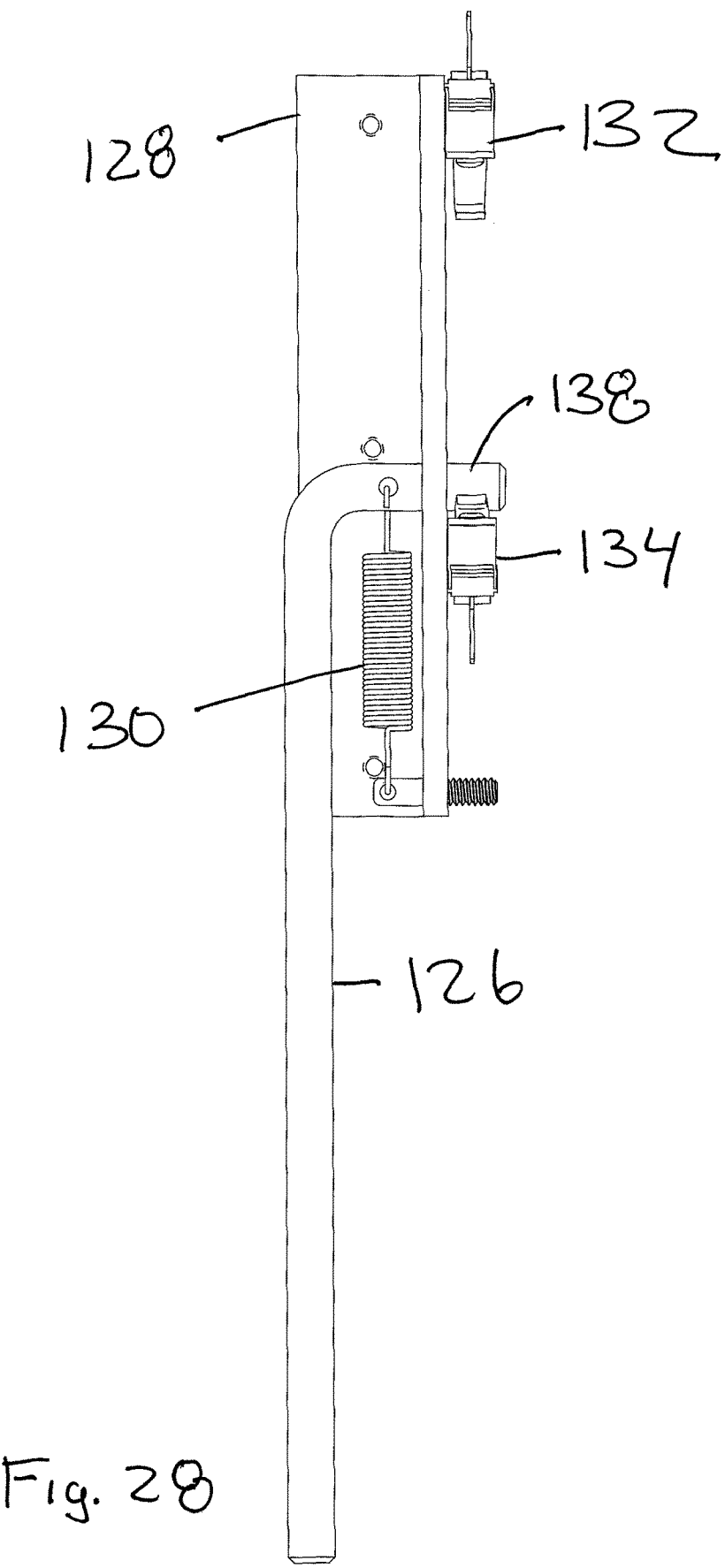
FIG. 28 is a front view of a limit switch assembly according to the present invention.

The motor assembly includes a motor housing 108, handle 110, leg cable port 112, light 114, push button switch 116, tower receiver 118, motor 52 and limit switch assembly, as shown in FIGS. 24-25. The handle 110 mounts to the motor housing 108 and is used attach and remove the motor assembly from the jack assembly. The leg cable port 112 is located on the top of the housing 108 and connects to the leg cable 24 to provide power to the motor 52. The light 114 is mounted on the bottom of the motor housing 106 to provide light about the leg movement system. The light 114 is connected to the leg cable port 112 for the reception of power to control light functions. The push button switch 116 is mounted above the handle 110 for easy activation and is connected to the leg cable port 112 for communication back to the MCU. The push button switch 116 is used to manually jog the motor 52 in the direction that raises the foot plate 94 of the jack assembly. The tower receiver 118 is mounted on the bottom of the motor housing 108. The tower receiver 118 is an open ended shape to match the shape of the jack tower 92 that includes the drive screw 98. The jack tower 92 and the open ended shape of the tower receiver 118 are shown as a square cylinder. The jack tower 92 and the open ended shape of the tower receiver 118 can be any shape as long as the jack tower 92 and the open ended shape of the tower receiver 118 are matched up so that jack tower 92 can be inserted into the tower receiver 118 so that the jack tower 92 and tower receiver 118 interlock together. The jack tower 92 and the tower receiver 118 are interlocked together to prevent rotation of the tower receiver 118 about the jack tower 92 during use of the motor 52. The motor 52 is mounted in the motor housing 108 in a fixed position. The motor 52 is mounted so that the motor shaft 120 aligns with the drive shaft 104 of the drive screw 98. The motor shaft 120 and the drive shaft 104 are a square shape that each fit into a coupler 122 having a square shaft receiver, so as to interconnect the motor shaft 120 and the drive shaft 104. With the interconnection of the motor shaft 120 and the drive shaft 104, rotation of the motor shaft 120 causes the rotation of the drive shaft 104 to produce movement of the foot plate 94. The coupler 122 is shown with set screws 124 to retain the coupler 122 on the motor shaft 120. The motor assembly as described allows for easy removal of the motor assembly from the jack assembly. When needed, the motor assembly is placed over the jack tower 92 with the drive shaft 98, so that the jack tower 92 is inserted into the tower receiver 118. When the jack tower 92 is inserted into the tower receiver 118, the drive shaft 104 of the drive screw 98 inserts into coupler 122. The push button switch 116 is also used to manually jog the motor 52 to align the coupler 122 to the drive shaft 104 during installation of the motor assembly onto the jack tower 92. The motor assembly can then be used to move the foot plate 94. FIG. 24 shows the foot plate 94 at its lowest point, whereby when the foot 54 of the table is supported by the foot plate 94, the leg 50 supported will be at its lowest point. FIG. 25 shows the foot plate 94 at its highest point, whereby when the foot 54 of the table is supported by the foot plate 94, the leg 50 supported will be at its highest point. Hence, the height of the corner of the table can be adjusted within the position of the lowest point and highest point of movement of the foot plate 94. When the table is level and the motor assembly is no longer needed, the motor assembly can be easily removed by pulling the motor assembly away from the jack tower 92. The motor assembly can be removed so that it is no longer in the way of the user of the table.

Figure 29:
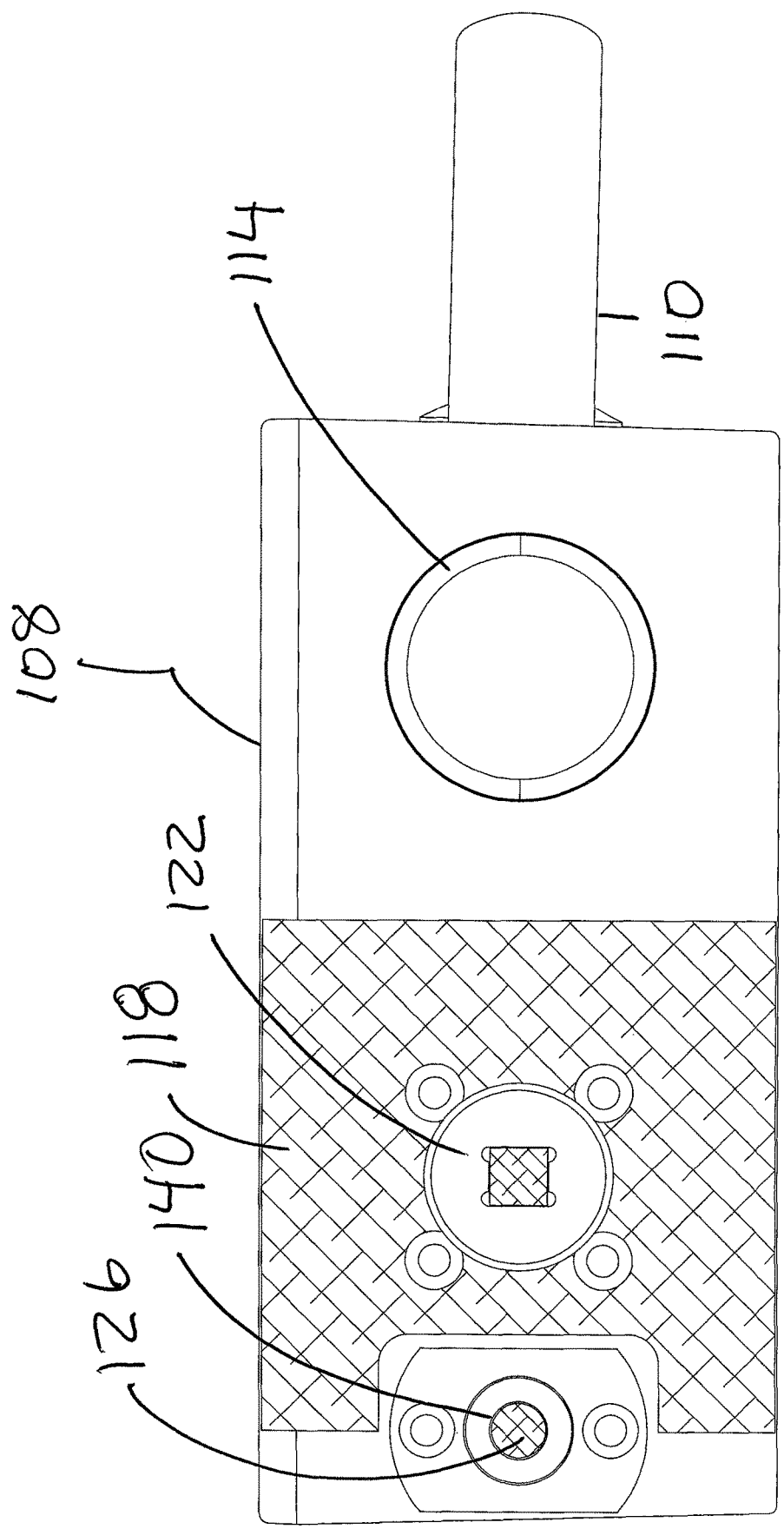
FIG. 29 is a cutaway bottom side view of a motor assembly according to the present invention.

The limit switch assembly is shown in FIGS. 24-29. The limit switch assembly includes a rod 126, rod mount plate 128, spring 130, upper limit switch 132 and lower limit switch 134. The rod mount plate 128 mounts to the motor housing 108. The rod mount plate 128 includes a travel slot 136. The rod 126 includes a slide pin 138 extending from the rod 126. FIG. 29 shows a bottom view of the motor housing 108 that includes a linear bearing with a rod guide hole 140. The rod 126 is movably mounted to the rod mount plate 128 and the rod guide hole 140 of the linear bearing. The spring 130 is connected between the rod mount plate 128 and the slide pin 138. The upper limit switch 132 is mounted to the rod mount plate 128 and above the travel slot 136, so that the upper limit switch 132 can be engaged by the slide pin 138. The lower limit switch 134 is mounted to the rod mount plate 128 and below the travel slot 136, so that the lower limit switch 134 can be engaged by the slide pin 138. The rod 126 extends downward from the motor housing 108 and contacts the nut plate 106. The rod 126 is retained against the nut plate 106 due to the spring 130 being a tension spring that pulls the rod 126 downward against the nut plate 106. The rod 126 moves upward and downward due to the movement of the nut plate 106. When the foot plate 94 is raised, the rod 126 moves upward due to the nut plate 106 forcing the rod 126 upwards and at the same time the slide pin 138 travels upward in the travel slot 136. When the foot plate 94 is lowered, the rod 126 moves downward due to the spring 130 pulling back on the rod 126 and at the same time the slide pin 138 travels downward in the travel slot 136. Over travel upward by the leg is prevented when the upper limit switch 132 is engaged by the slide pin 138. Over travel downward by the leg is prevented when the lower limit switch 134 is engaged by the slide pin 138.

Each leg 50 of the table is placed so that the foot 54 of the table is supported by the foot plate 94 of the jack assembly. Each motor 52 of the motorized external jack system is connected to each leg cable port 112. The leg cable ports 112 provide power to the motors 52. The leg cables 24 connect the motors 52 of each motorized external jack system to the MCU of the controller system. The MCU sends power to each motor 52 to turn the drive screws 98 in order to raise and lower the legs 50. For example, FIG. 24 shows the foot plate 94 in the lowest position. When the motor 52 is activated by the MCU, the motor 52 will be commanded to turn the drive screw 98 in the direction that causes the leg 50 to rise due to movement of the foot plate 94 upward, as shown in FIG. 25. The reverse is true when the leg 50 is to be lowered. The leg 50 is lowered by commanding the motor 52 to turn the drive screw 98 so that the foot plate 94 moves downward.

There are other optional additions to the leveling system. A DC battery can be used for operational power to eliminate the need for AC power cord. A mobile application for a smartphone that allows for system control, system status, and provides system notifications wireless communication can be added. Wireless sensor communication can be employed to eliminate the need for sensor bar cabling.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. A leveling system for leveling a table having a top surface and at least three legs, comprising:
   at least three sensor bars that act as individual digital levels adapted to be placed on top surface of the table;
   a leg movement system adapted to be attached to the table and adapted to raise and lower the legs to achieve a level top surface;
   a controller system that is connected to said sensor bars to receive data from said sensors bars and to said leg movement system to command movement of said leg movement system that is adapted to raise and lower the table, said controller system including a leveling software algorithm which inputs said data from said sensor bars and controls activation of said leg movement system;
   wherein each of said sensor bars includes an accelerometer to sense inclination of said sensor bar and provide inclination data to said controller system; and
   wherein each of said sensor bars includes further includes microcontroller and an analog to digital convertor to store and provide inclination data to said controller system.

2. A leveling system for leveling a table having a top surface and at least three legs, comprising:
   at least three sensor bars that act as individual digital levels adapted to be placed on top surface of the table;
   a leg movement system adapted to be attached to the table and adapted to raise and lower the legs to achieve a level top surface;
   a controller system that is connected to said sensor bars to receive data from said sensors bars and to said leg movement system to command movement of said leg movement system that is adapted to raise and lower the table, said controller system including a leveling software algorithm which inputs said data from said sensor bars and controls activation of said leg movement system;
   wherein each of said sensor bars includes an accelerometer to sense inclination of said sensor bar and provide inclination data to said controller system; and
   wherein said controller system includes a microcontroller, DC motor driver integrated circuits, an analog-to-digital integrated circuit and a power supply.

3. The leveling system of claim 2, wherein said power supply provides power for both said controller assembly and said movement assembly.

4. A leveling system for leveling a table having a top surface and at least three legs, comprising:
   at least three sensor bars that act as individual digital levels adapted to be placed on top surface of the table;
   a leg movement system adapted to be attached to the table and adapted to raise and lower the legs to achieve a level top surface;
   a controller system that is connected to said sensor bars to receive data from said sensors bars and to said leg movement system to command movement of said leg movement system that is adapted to raise and lower the table, said controller system including a leveling software algorithm which inputs said data from said sensor bars and controls activation of said leg movement system; and
   wherein said leg movement system comprises a jack for each leg of the table that is adapted to be removably attached to the leg to raise and lower the leg, each of said jack connected to said controller assembly to be commanded to raise and lower each of said jack.

5. The leveling system of claim 4, wherein each of said jack includes a movable foot plate adapted to receive and retain a bottom of a leg of the table; wherein each of said foot plate is moveably to raise and lower said leg; and wherein said each of said foot plate is interconnected to a base that is adapted to contact a support surface so that said base supports said moveable foot plate.

6. The leveling system of claim 5, wherein each of said jack includes a motor interconnected to said foot plate to move said foot plate up and down.

7. The leveling system of claim 6, wherein each of said jack includes a jack screw and a drive screw; wherein each of said jack screw and said drive screw includes a sprocket; wherein each of said jack includes a chain attached to said sprocket such that if one sprocket turns, then the other sprocket turns due to said chain; wherein a motor shaft of each of said motor is connected to said drive screw, and wherein said foot plate is interconnected to a set of said drive screw and said jack screw to move said foot plate up and down due to rotation of said motor shaft.

8. The leveling system of claim 7, wherein each of said motor drive shaft is attached to each of said drive screw in a way that said motor drive shaft and said motor can be removed without tools from said leg movement system.

9. The leveling system of claim 4, wherein each of said jack includes a motor interconnected by a drive bolt to a foot, said each of said foot is adapted to contact a support surface so that each of said foot supports each leg.

10. The leveling system of claim 9, wherein each of motor is mounted inside each of the leg of the table such that said drive bolt is adapted to extend out of the leg and connect to said foot; and wherein each of said drive bolt moves in and out of the leg to lower and raise the leg.

* * * * *